United States Patent
Woytach et al.

(10) Patent No.: US 11,571,640 B2
(45) Date of Patent: Feb. 7, 2023

(54) QUICK OIL CHANGE FILTER AND ASSEMBLY

(71) Applicant: BRIGGS & STRATTON, LLC, Wauwatosa, WI (US)

(72) Inventors: Elizabeth Woytach, Wauwatosa, WI (US); Bryce Metcalf, Wauwatosa, WI (US); Randall Ammentorp, Wauwatosa, WI (US); Chris Martinek, Wauwatosa, WI (US); Rodney Balzar, Wauwatosa, WI (US); Glen Stroik, Wauwatosa, WI (US)

(73) Assignee: Briggs & Stratton, LLC, Wauwatosa, WI (US)

( * ) Notice: Subject to any disclaimer, the term of this patent is extended or adjusted under 35 U.S.C. 154(b) by 0 days.

(21) Appl. No.: 16/937,027

(22) Filed: Jul. 23, 2020

(65) Prior Publication Data
US 2021/0023480 A1    Jan. 28, 2021

Related U.S. Application Data

(60) Provisional application No. 62/878,285, filed on Jul. 24, 2019.

(51) Int. Cl.
*B01D 27/08*    (2006.01)
*B01D 27/10*    (2006.01)
(Continued)

(52) U.S. Cl.
CPC ........... *B01D 27/08* (2013.01); *B01D 27/103* (2013.01); *B01D 27/106* (2013.01);
(Continued)

(58) Field of Classification Search
CPC .... B01D 27/08; B01D 27/103; B01D 27/106; B01D 27/148; B01D 35/18; B01D 35/30;
(Continued)

(56) References Cited

U.S. PATENT DOCUMENTS 5,015,375 A    5/1991    Fleck
D337,691 S    7/1993    Raunkjaer
(Continued)

FOREIGN PATENT DOCUMENTS

DE    4430341 A1 *    3/1995    ............. B01D 29/21
WO    WO-2013079172 A1 *    6/2013    ........... B01D 36/003

OTHER PUBLICATIONS

"Briggs & Stratton Genuine OEM 396424S", Jul. 8, 2015, Amazon, site visited Jan. 12, 2021: https://www.amazon.com/dp/B01184RSDS/ (Year: 2015).
(Continued)

*Primary Examiner* — Waqaas Ali
(74) *Attorney, Agent, or Firm* — Foley & Lardner LLP

(57) ABSTRACT

A filtration system includes a filter housing and a filter cartridge. The filter housing includes a base and a cover removably coupled to the base. The cover includes a retainer. The filter cartridge has a longitudinal axis and is movable between an installed position within the filter housing and an uninstalled position outside the filter housing. The filter cartridge includes a top endplate including at least one protrusion extending upwardly away from the top endplate. The protrusion includes a tab extending radially outward from the protrusion that is structured to interact with the retainer to removably couple the filter cartridge to the cover. The filter cartridge further includes a bottom endplate and a filter media extending axially between the top endplate and the bottom endplate.

18 Claims, 20 Drawing Sheets

(51) Int. Cl.
    *B01D 35/30*     (2006.01)
    *B01D 27/14*     (2006.01)
    *F01M 11/03*     (2006.01)
    *F01M 5/00*     (2006.01)
    *B01D 35/18*     (2006.01)

(52) U.S. Cl.
    CPC ........... *B01D 27/148* (2013.01); *B01D 35/18* (2013.01); *B01D 35/30* (2013.01); *F01M 5/002* (2013.01); *F01M 11/03* (2013.01); *B01D 2201/295* (2013.01); *B01D 2201/316* (2013.01); *F01M 2011/036* (2013.01)

(58) Field of Classification Search
    CPC ........ B01D 2201/295; B01D 2201/316; B01D 29/21; B01D 29/232; B01D 35/16; B01D 35/153; F01M 5/002; F01M 11/03; F01M 2011/036
    See application file for complete search history.

(56) References Cited

U.S. PATENT DOCUMENTS

| | | | |
|---|---|---|---|
| 5,462,675 A * | 10/1995 | Hopkins | B01D 29/925 55/501 |
| 6,156,198 A | 12/2000 | Bartels | |
| D440,294 S | 4/2001 | Bilek | |
| 6,423,215 B1 | 7/2002 | Stein | |
| 6,488,845 B1 | 12/2002 | Neufeld et al. | |
| 7,531,090 B1 | 5/2009 | Stamey et al. | |
| 7,882,961 B2 | 2/2011 | Menez et al. | |
| D724,179 S | 3/2015 | Keenan et al. | |
| 9,186,602 B2 * | 11/2015 | Rathod | B01D 36/003 |
| D782,000 S | 3/2017 | Morris et al. | |
| D791,276 S | 7/2017 | Sharratt | |
| 9,903,241 B2 | 2/2018 | Hellman et al. | |
| D815,516 S | 4/2018 | Karmarkar et al. | |
| 10,018,090 B2 | 7/2018 | Maguin | |
| D852,319 S | 6/2019 | Hellman et al. | |
| D854,650 S | 7/2019 | Hellman et al. | |
| 2003/0209482 A1 | 11/2003 | Klotz et al. | |
| 2004/0025485 A1 | 2/2004 | Lee | |
| 2007/0180993 A1 | 8/2007 | Byun et al. | |
| 2014/0061137 A1 | 3/2014 | Stamey et al. | |
| 2014/0138303 A1 | 5/2014 | Takeda et al. | |
| 2014/0284268 A1 | 9/2014 | Volkmer | |
| 2017/0100685 A1 | 4/2017 | Ren et al. | |
| 2017/0106314 A1 | 4/2017 | Stamey et al. | |
| 2017/0252679 A1 | 9/2017 | Muir et al. | |
| 2017/0274303 A1 | 9/2017 | Robison et al. | |
| 2018/0195475 A1 | 7/2018 | Hussain | |

OTHER PUBLICATIONS

"Fram C235 Heavy Duty Oil and Fuel Filter", Sep. 23, 2014, Amazon, site visited Jan. 12, 2021: https://www.amazon.ca/dp/B000CNN516/ (Year: 2014).

Premium Guard5839EX, Mar. 27, 2015, Amazon, site visited Jan. 12, 2021: https://www.amazon.com/dp/B00VAFBFTO/ (Year: 2015).

\* cited by examiner

QUICK OIL CHANGE FILTER AND ASSEMBLY

CROSS-REFERENCE TO RELATED PATENT APPLICATIONS

This application claims priority to U.S. Provisional Patent Application No. 62/878,285, filed on Jul. 24, 2019, the content of which is hereby incorporated by reference in its entirety.

BACKGROUND

The present disclosure relates generally to filter assemblies for filtering fluids in internal combustion engine systems. More specifically, the disclosure relates to a filter assembly for filtering oil that is used within internal combustion engine systems.

SUMMARY OF THE INVENTION

One embodiment relates to a filtration system including a filter housing and a filter cartridge. The filter housing includes a base and a cover removably coupled to the base. The cover includes a retainer. The filter cartridge has a longitudinal axis and is movable between an installed position within the filter housing and an uninstalled position outside the filter housing. The filter cartridge includes a top endplate, a bottom endplate, and a filter media extending axially between the top endplate and the bottom endplate. The top endplate includes at least one protrusion extending upwardly away from the top endplate. The at least one protrusion includes a tab extending radially outward from the protrusion and that is structured to interact with the retainer to removably couple the filter cartridge to the cover.

Another embodiment relates to a filtration system including a filter housing, a filter cartridge, and a pipe. The filter housing includes a base and a cover that is removably coupled to the base. The base includes an outlet and an inlet fluidly coupled to the outlet. The cover includes a retainer. The filter cartridge has a longitudinal axis and is movable between an installed position within the filter housing and an uninstalled position external from the filter housing. The filter cartridge includes a top endplate, a bottom endplate, and a filter media extending axially between the top endplate and the bottom endplate. The bottom endplate includes a flexible portion and a filter outlet opening. The top endplate includes at least one protrusion structured to interact with the retainer to removably couple the filter cartridge to the cover. The pipe is coupled to the base and extends into the filter outlet opening and toward the top endplate when the filter cartridge is in the installed position to define a portion of a fluid flow path between the inlet and the outlet.

Another embodiment relates to an internal combustion engine. The internal combustion engine includes a blower housing and a filtration system. The filtration system is positioned in a path of cooling air from the blower housing and includes a filter housing and a filter cartridge. The filter housing includes a base and a cover removably coupled to the base. The cover includes a retainer. The filter housing further includes one or more fins formed on an outer surface of the base. The filter cartridge has a longitudinal axis and is movable between an installed position within the filter housing and an uninstalled position outside the filter housing. The filter cartridge includes a top endplate including at least one protrusion extending upwardly away from the top endplate. The protrusion includes a tab extending radially outward from the protrusion and is structured to interact with the retainer to removably couple the filter cartridge to the cover. The filter cartridge further includes a bottom endplate and a filter media extending axially between the top endplate and the bottom endplate.

DETAILED DESCRIPTION

Figure 1:
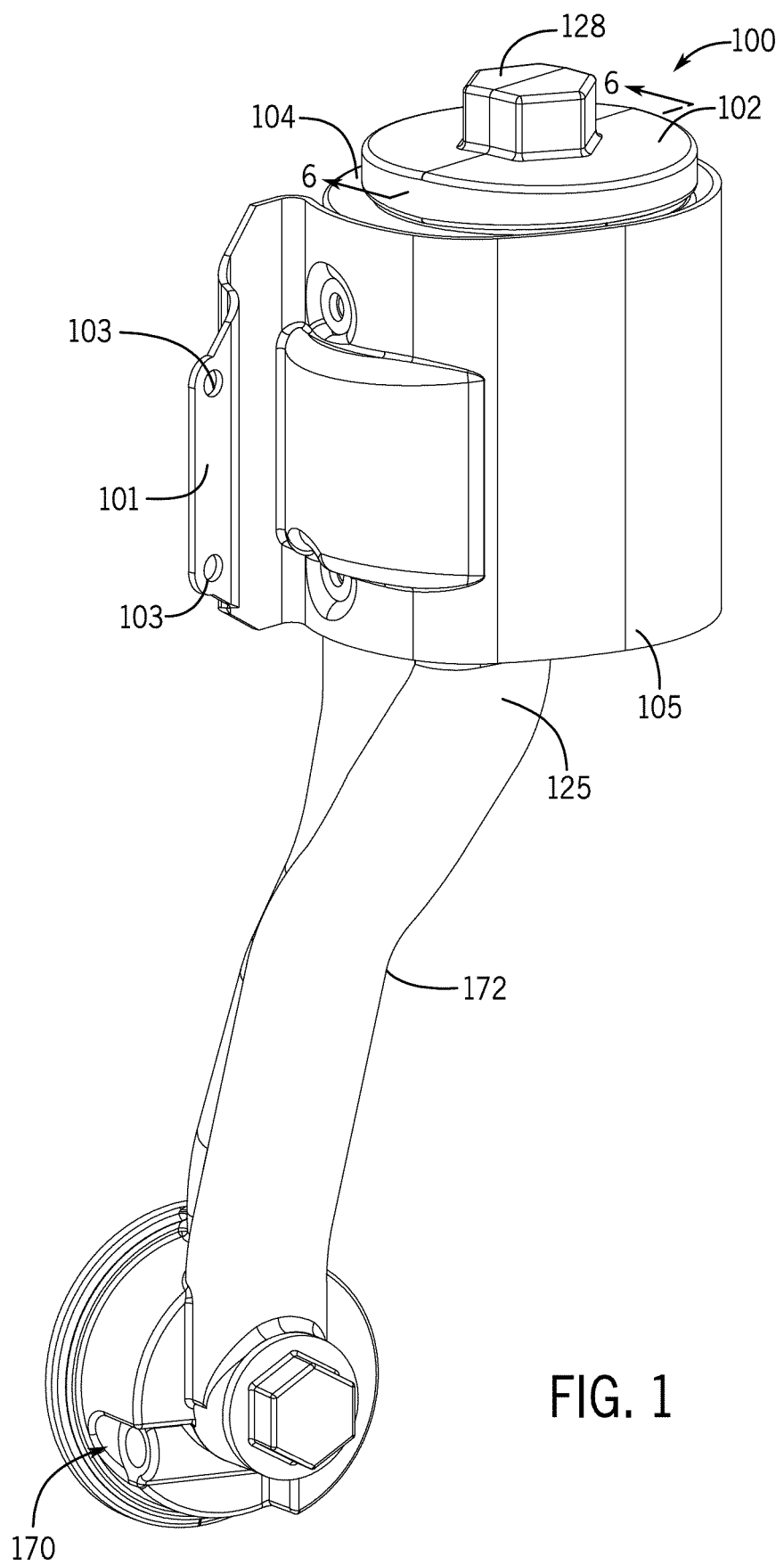
FIG. 1 is a perspective view of a filtration system, according to an exemplary embodiment.
Figure 2:
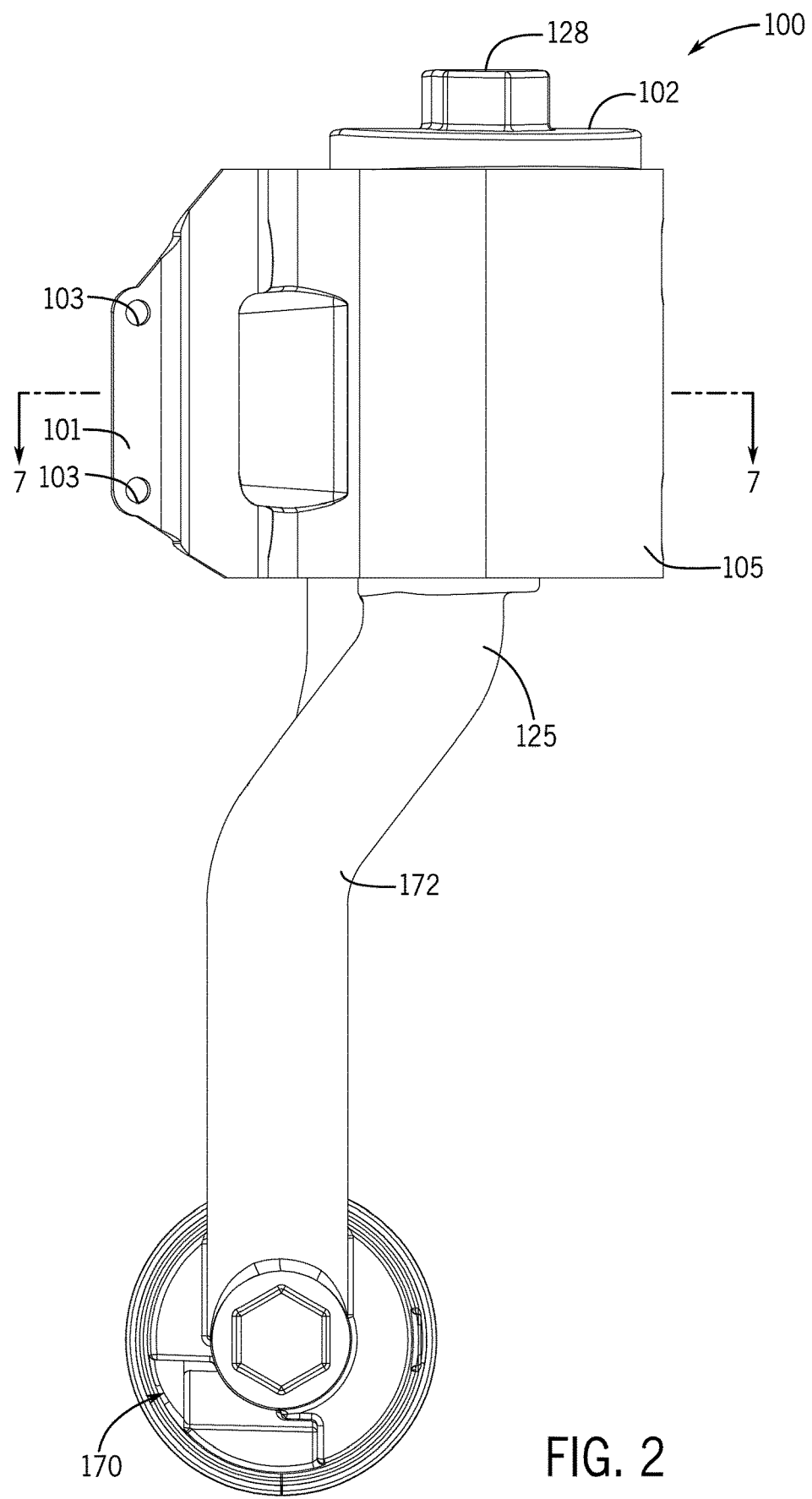
FIG. 2 is a front view of the filtration system of FIG. 1.

Referring to the figures generally, a filtration system is described. The filtration system has a filter cartridge removably received within a filter housing. The filter housing includes a base and a cover that can be removed from the base to permit access into the filter housing. The filter cartridge and cover are removably coupled together so that the filter cartridge may be easily removed from the filter housing for servicing and replacement purposes by decoupling the cover from the base. The filtration system described herein reduces mess and the likelihood of spills or drips relating to changing filter cartridges or other servicing of the filtration system and increases the ease of access to the filtration system. The filtration system also has an improved life cycle that increases the time period between filter cartridge changes (e.g., by 2.5 to 5 times the current interval). The filtration system uses cyclonic filtering and cools the fluid during the filtering process to further extend the fluid life. In addition, the cover and filter cartridge are designed so that the filter cartridges can be changed using only a standard tool (e.g., socket, crescent wrench, adjustable wrench). A user can couple or decouple the cover and filter cartridge from the base without specialized tools. The filter cartridge is further designed to be both coupled and decoupled from the cover without tools (e.g., using a press-fit), again promoting faster assembly and disassembly.

The filter cartridge includes filter media and a top endplate that includes one or more protrusions that interact with a retainer on the filter housing (e.g., on the cover of filter housing). The interaction between the protrusions of the top endplate and the retainer of the cover allow the filter cartridge to be removed when the cover of the filter housing is separated (e.g., unscrewed) from the base. The cover of the filter housing also includes a cup which retains or catches fluid (e.g., oil) that may either run off from the filter media or the cover, thereby reducing the amount of fluid dripping off of the cover when the cover is removed from the base of the filter housing. In addition, the fluid filtration system is positioned higher on the engine than conventional filtration systems, which allows easy access to the filtration system for a user. When removing the filtration cartridge from the filter housing, the filtration cartridge is removed in a vertical/upward direction (e.g., along a longitudinal axis of the filter cartridge and filter housing) rather than horizontally outward. The vertical removal process allows the filtration system to be positioned within tight clearance spaces on the engine and/or on outdoor power equipment.

The filtration systems described herein can be used in any number of fluid systems including, but not limited to, an oil filtration system. The filtration system described herein can be used on engines used on any type of outdoor power equipment. Outdoor power equipment includes lawn mowers, riding tractors, snow throwers, pressure washers, tillers, log splitters, zero-turn radius mowers, walk-behind mowers, riding mowers, stand-on mowers, pavement surface preparation devices, industrial vehicles such as forklifts, utility vehicles, commercial turf equipment such as blowers, vacuums, debris loaders, over seeders, power rakes, aerators, sod cutters, brush mowers, and portable generators, for example.

FIGS. 1-9 show a filtration system 100 according to an exemplary embodiment. The filtration system 100 includes a filter cartridge 110 (see FIG. 6) positioned within a filter housing 104 including and partially defined by a cover 102 and a base 125. The base 125 includes a connection portion 172 formed as an integral piece with the rest of the base 125. The connection portion 172 includes one or more conduits (e.g., an inlet 114, a drain 118, and an outlet 119) that are in fluid communication with components of an engine 200 and direct fluid through various components of the engine 200. As depicted, the engine 200 can be an internal combustion engine having one or more cylinders. The connection portion 172 can interface with and couple the filtration system 100 to a sump of the engine 200.

The filter housing 104 is structured to direct fluid from the inlet 114, through the filter cartridge 110, and out the outlet 119 to clean the fluid before it is passed back to the engine 200. As depicted in FIGS. 6-9, the base 125 includes an inlet 114 for receiving dirty fluid to be filtered, an outlet 119 for directing cleaned fluid back to the engine, a drain 118, and a cavity that receives the filter cartridge 110. The inlet 114, outlet 119, and drain 118 are all formed as part of (e.g., integral with) the base 125. The filter cartridge 110 is positioned between the inlet 114 and outlet 119 so that any fluid passing into the filtration system 100 along a primary fluid flow path is passed through the filter cartridge 110 before exiting the filtration system 100. In some embodiments, the inlet 114 includes an anti-drain back valve positioned therein. The anti-drain back valve mitigates the risk of the engine dry running on startup due to the filtration system 100 draining through the fluid galleries during shut down or storage. The anti-drain back valve keeps the filtration system 100 full of fluid during shut downs and when in storage so the filtration system 100 does not need to be primed with every engine startup.

In some examples, the base 125 defines a secondary flow path through the filtration system 100 that avoids the filter cartridge 110. For example, the connection portion 172 can include a pressure bypass valve 170. The pressure bypass valve 170 allows the fluid to bypass the filter cartridge 110 and connection portion 172 if the filter cartridge 110 is clogged or otherwise blocked. If a blockage is present within the filtration system 110, pressure will rise. If the pressure exceeds a threshold value, the pressure bypass valve 170 will open, which redirects fluid away from the filter cartridge 110 and out of the filtration system 100. The pressure bypass valve 170 thus protects the filtration system 100 and engine from damage due to a clogged filter, and creates a secondary fluid flow path between the inlet 114 and outlet 119 that is opened once the threshold pressure is exceeded.

The filter housing 104 (e.g., the base 125 proximate the cover 102) includes different structures to manage heat within the engine 200 and filtration system 100. For example, the base 125 of the filter housing 104 includes one or more fins 130 extending away (e.g., radially outward) from the filter housing 104. The fins 130 create additional surface area for heat transfer from the filter housing 104 (e.g., allowing the filter housing 104 to cool faster) as cooling air passes over the assembly. The filtration system 100 also includes a heat shield 105 to reduce the transfer of heat from the engine 200 to the filtration system 100.

Figure 3:
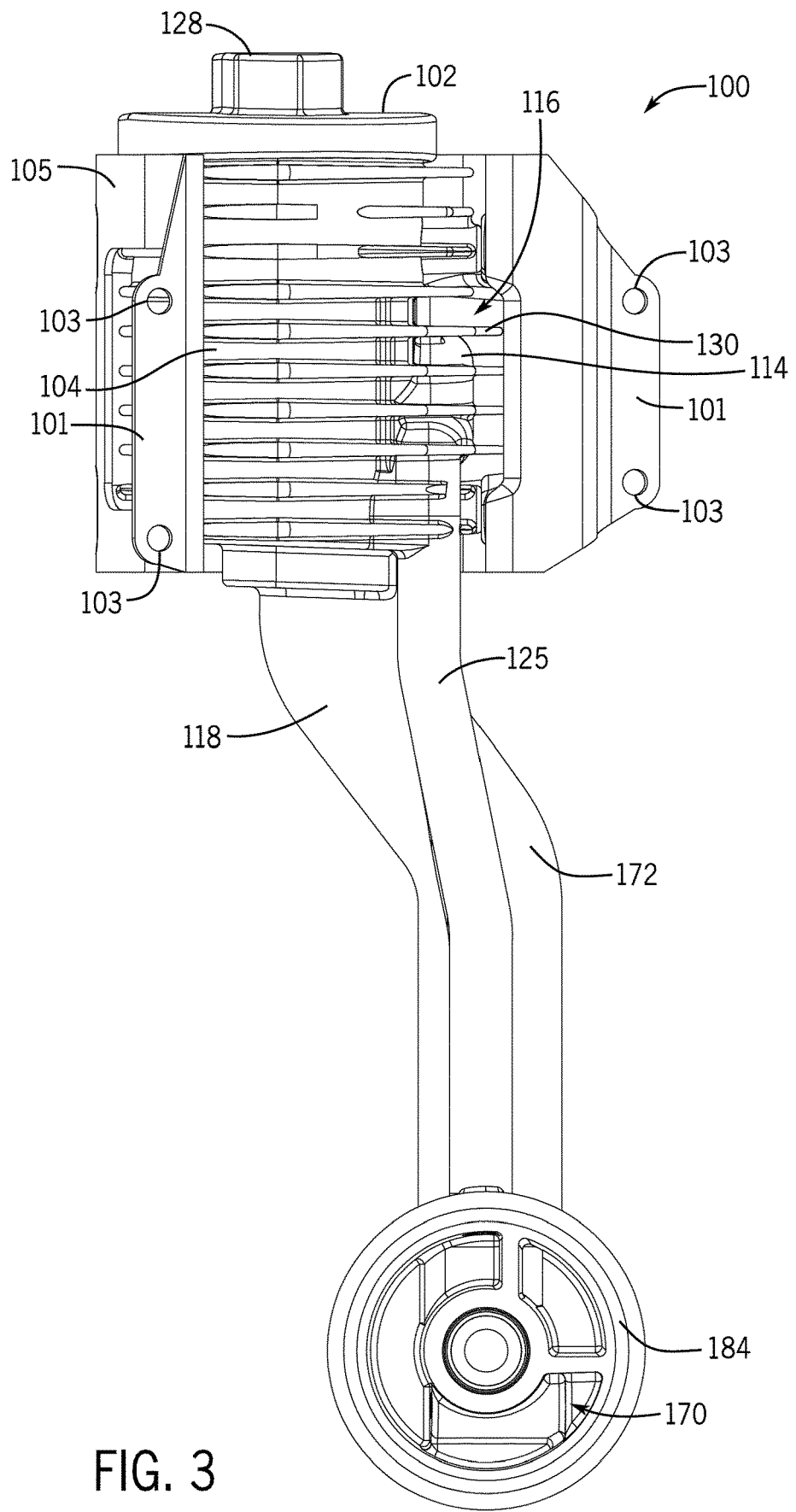
FIG. 3 is a rear view of the filtration system of FIG. 1.
Figure 4:
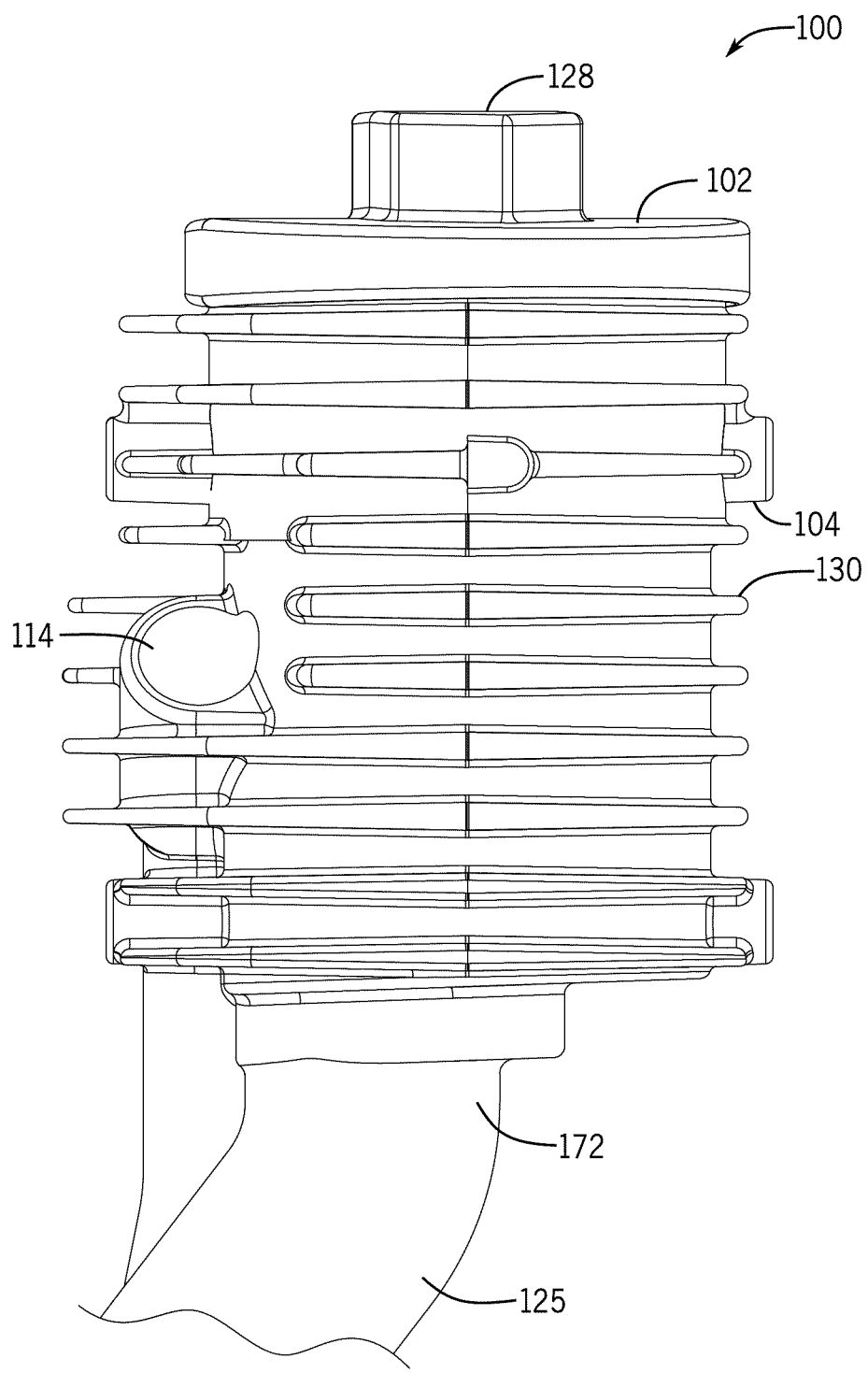
FIG. 4 is a front view of a portion of the filtration system of FIG. 1.
Figure 5:
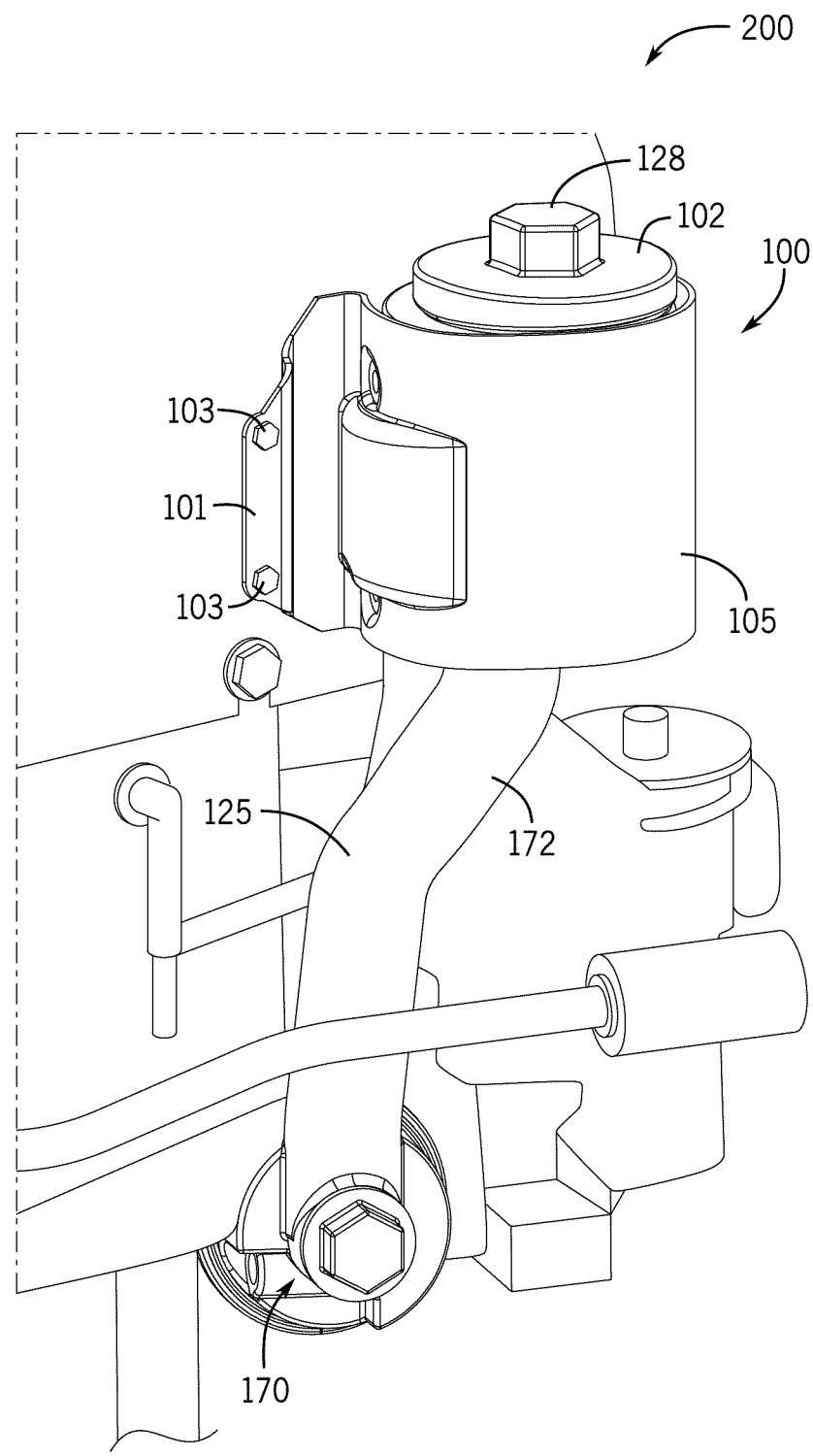
FIG. 5 is a perspective view of the filtration system of FIG. 1 in use on an engine.

As shown in FIG. 3, the heat shield 105 at least partially surrounds the filter housing 104. The heat shield 105 includes one or more flanges 101 and one or more apertures 103 extending through the flanges 101. As shown in FIG. 5, the heat shield 105 can be fastened to (e.g., attached to, mounted on) a blower housing of the engine using fasteners extending through the apertures 103 on the flanges 101. The heat shield 105 and filter housing 104 are positioned proximate a cooling air discharge near the blower housing of the engine 200. The cooling air may exit through a window in the blower housing. When assembled, a gap 116 is formed between the heat shield 105 and the filter housing 104. The heat shield 105 partially surrounding the filter housing 104 directs the cooling air over the fins 130 within the gap 116 and allows the air to escape after the air has circumnavigated the filter housing 104 at least once. The heat shield 105 helps to cool the filter housing 104 and the fluid being filtered therein, thereby extending the life of the filter cartridge 110 and the time period between filter changes. Accordingly, the filtration system 100 described herein acts as both an oil filter and an oil cooler. In some embodiments, the filtration system 100 includes metallic oil lines facilitating additional cooling of the fluid.

The base 125 and the cover 102 cooperate to form the filter housing 104 and receive the filter cartridge 110. The cover 102 is removably coupled to the base 125 via a threaded connection formed by first threads 107 on the cover 102 and second threads 109 on the base 125. In some embodiments, the cover 102 is removably coupled to the base 125 via a non-threaded (e.g., quarter turn) engagement. One or more seal members 140 (e.g., gaskets, O-rings) are positioned between the cover 102 and the base 125 to seal the cover 102 to the base 125 when the filter cartridge 110 is in an installed position within the filter housing 104. The filter housing 104 can be made of any material suitable for use in a fluid filter, for example metal or plastic.

The filter cartridge 110 is generally cylindrical and extends along a longitudinal axis 150. The filter cartridge 110 includes filter media 115 extending axially between a top endplate 108 and a bottom endplate 106. The top endplate 108 is coupled to a first end of the filter media 115 and the bottom endplate 106 is coupled to a second end of the filter media 115.

The top endplate 108 includes a quick release mechanism that interacts with the cover 102 to securely and removably couple the cover 102 with the filter cartridge 110. As depicted in FIGS. 6-9, the top endplate 108 includes protrusions 132 angularly spaced apart from one another about the longitudinal axis 150. The protrusions 132 extend axially away (e.g., substantially parallel to the longitudinal axis 150) from a top surface 139 of the top endplate 108. The protrusions 132 include tabs 134 that extend substantially perpendicular to the longitudinal axis 150, radially outward from the protrusions 132. The tabs 134 are structured to interact with a retainer 136 that is formed within the cover 102. In some examples, the retainer 136 is a ledge formed within a central opening 135 of the cover 102. The retainer 136 is defined by an inner diameter than is smaller than an outer diameter defined by the tabs 134, such that the tabs 134 and retainer 136 form a press fit when the filter cartridge 110 is installed into the cover 102. The tabs 134 interact with the retainer 136 (e.g., in a snap-fit) to prevent relative axial movement of the filter cartridge 110 away from the cover 102 once the tabs 134 have engaged the retainer 136. In some examples, the top endplate 108 includes four protrusions 132 that are evenly spaced apart from one another about the longitudinal axis 150 to provide even loading and engagement between the filter cartridge 110 and the cover 102.

The removable coupling formed between the cover 102 and the filter cartridge 110 promotes faster and cleaner installation and disassembly processes. When the cover 102 is removed from and/or installed into the filter housing 104, the interaction between the tabs 134 and the retainer 136 retains the top endplate 108 of the filter cartridge 110 within the cover 102. As such, when the cover 102 is removed from the base 125 (e.g., by unscrewing the cover 102), the filter cartridge 110 moves axially out of the base 125 together with the cover 102. The cover 102 can act as a handle for the user for removing the filter cartridge 110 from the filter housing 104 without the user having to touch the filter cartridge 110 itself. In addition, the engagement between the cover 102 and filter cartridge 110 allows the user to remove the filter cartridge 110 from the filtration system 100 without the use of tools and/or with a single standard socket. The snap-fit between the tabs 134 and the retainer 136 is strong enough to keep the filter cartridge 110 retained within the cover 102 as the cover 102 is removed from the base 125, but is also not so strong such that it is difficult for a user to remove the cover 102 from the filter cartridge 110 when exchanging an old filter cartridge 110 for a new filter cartridge. Accordingly, if an axial force exceeding a threshold value is applied, the tabs 134 of the top endplate 108 will flex inward and release from the retainer 136 to enable the exchange of the filter cartridge 110. Alternatively, a user can apply a radially-inward force onto one or more of the protrusions 132, which will flex inward so that the tabs 134 will release the retainer 136 and allow the top endplate 108 to be decoupled from the cover 102.

Figure 6:
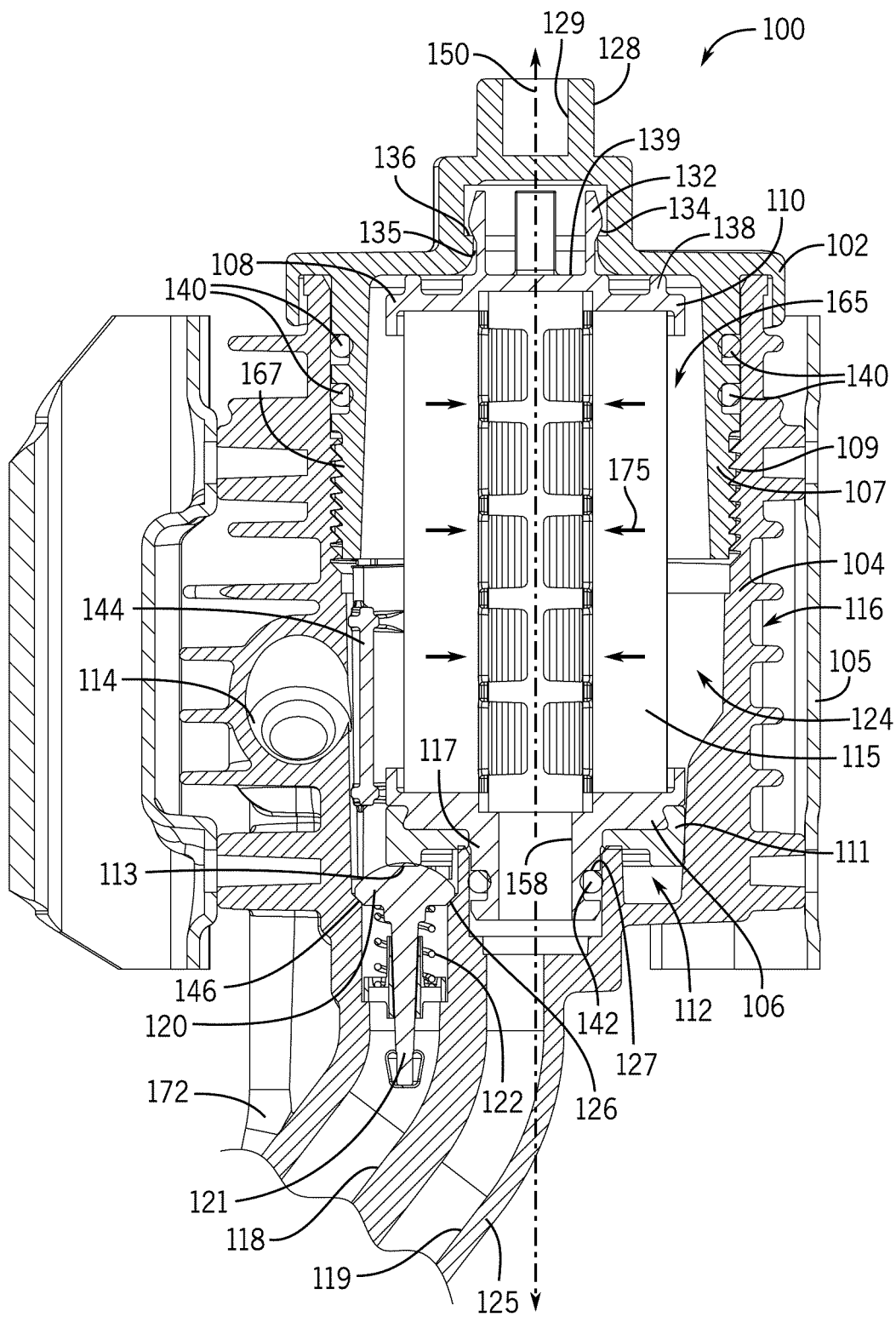
FIG. 6 is a cross-sectional view of a portion of the filtration system of FIG. 1, taken along line 6-6 in FIG. 1.

The top endcap 108 and filter cartridge 110 are designed to reduce the likelihood of spills during disassembly. As depicted in FIG. 6, the cover 102 additionally includes a cup 167 extending downward substantially axially and at least partially the length of the filter cartridge 110. The cup 167 surrounds the filter media 115 on all sides and extends at least a portion of the length of the filter media 115. The cup 167 extends away from an underside of the cover 102 and is positioned radially outward from the filter cartridge 110. When the cover 102 and filter cartridge 110 are removed from the filter housing 104, the user can turn the partial assembly upside down such that fluid dripping from or otherwise remaining within either the filter cartridge 110 or cover 102 is captured within the cup 167. Accordingly, the cup 167 helps to reduce the potential mess of removing and replacing the filter cartridge 110. The top endplate 108 also includes a rim 138 formed on and extending axially from the top surface 139. The rim 138 provides a small contact surface when the cover 102 spins against the filter cartridge 110 during installation. The rim 138 reduces friction between the cover 102 and the filter cartridge 110 relative to conventional filters.

The bottom endplate 106 of the filter cartridge 110 directs fluid out of the filter media 115 and aids in the assembly process. The bottom endplate 106 includes a center projection 117 and an endplate central opening 158 formed through the center projection 117 that allows filtered fluid to flow out of the filter cartridge 110 and into the outlet 119. In an installed position of the filter cartridge 110, the center projection 117 fits within and sealingly engages an outlet opening 127 on the base 125. A seal member 142 (e.g., gasket, O-ring) is positioned on the center projection 117 between the bottom endplate 106 and the outlet opening 127 to seal the bottom endplate 106 (e.g., center projection 117) to the base 125 (e.g., outlet opening 127).

Figure 7:
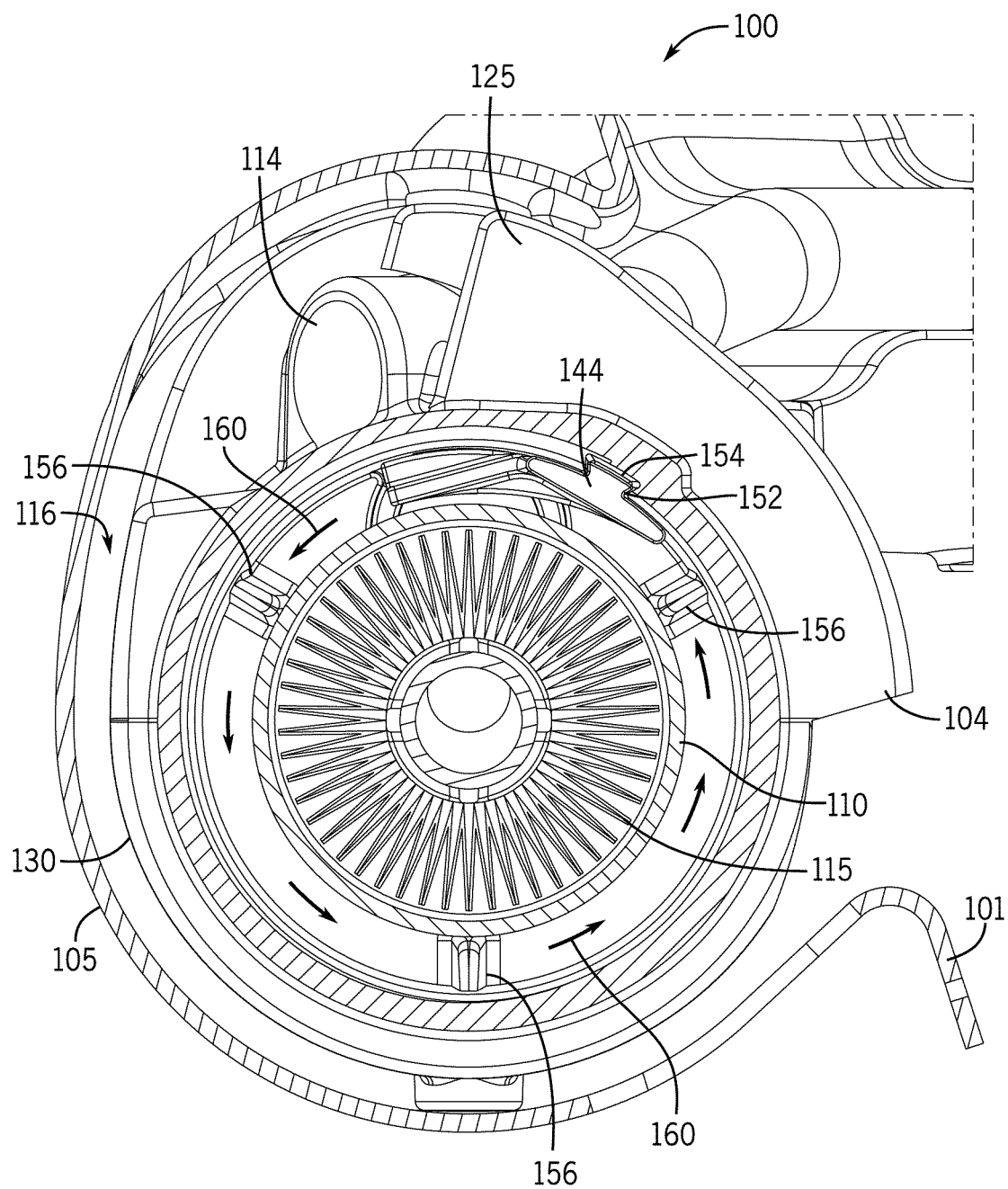
FIG. 7 is a cross-sectional view of a portion of the filtration system of FIG. 1, taken along line 7-7 in FIG. 2.
Figure 8:
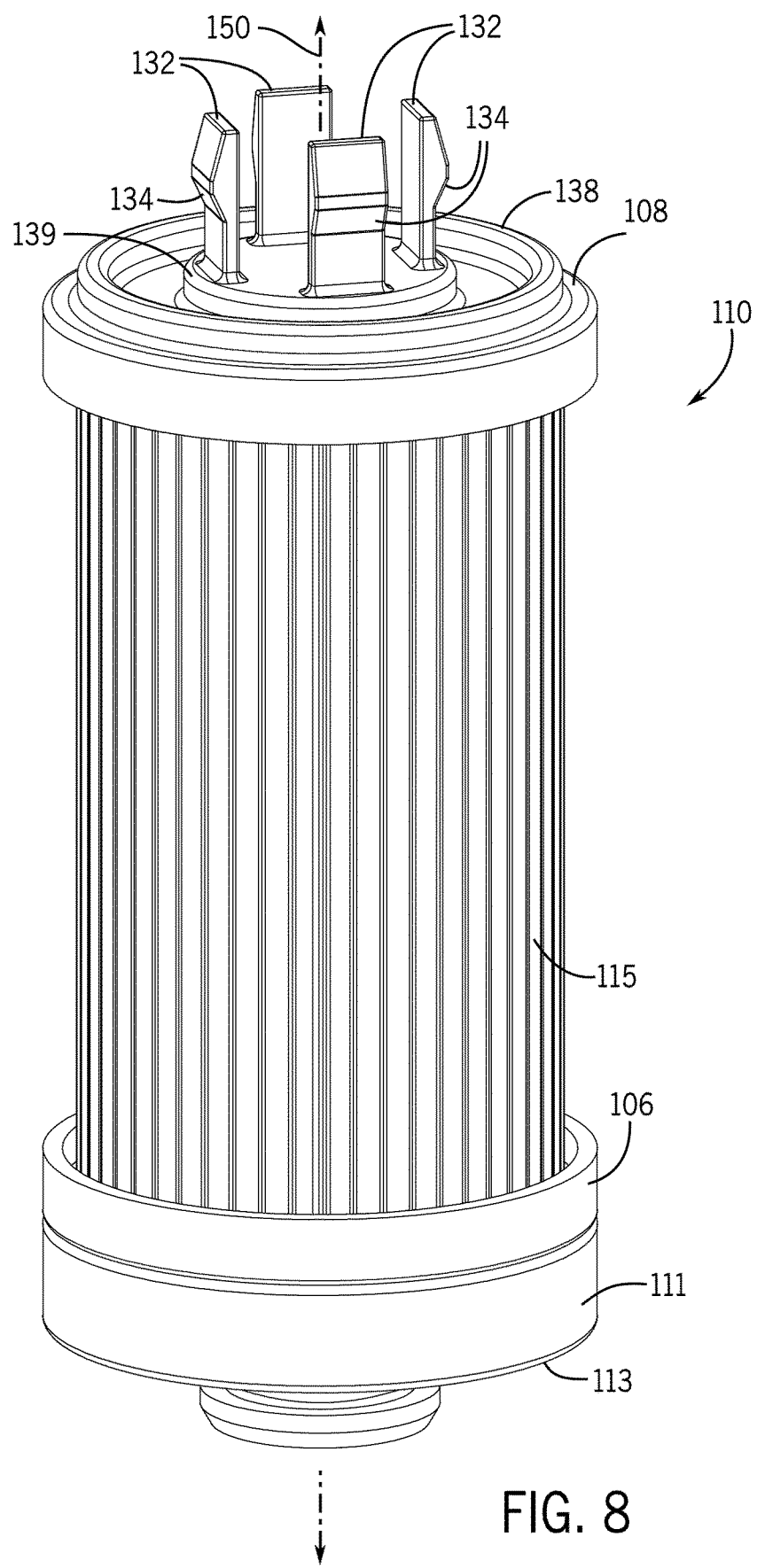
FIG. 8 is a top perspective view of a filter cartridge within the filtration system of FIG. 1.
Figure 9:
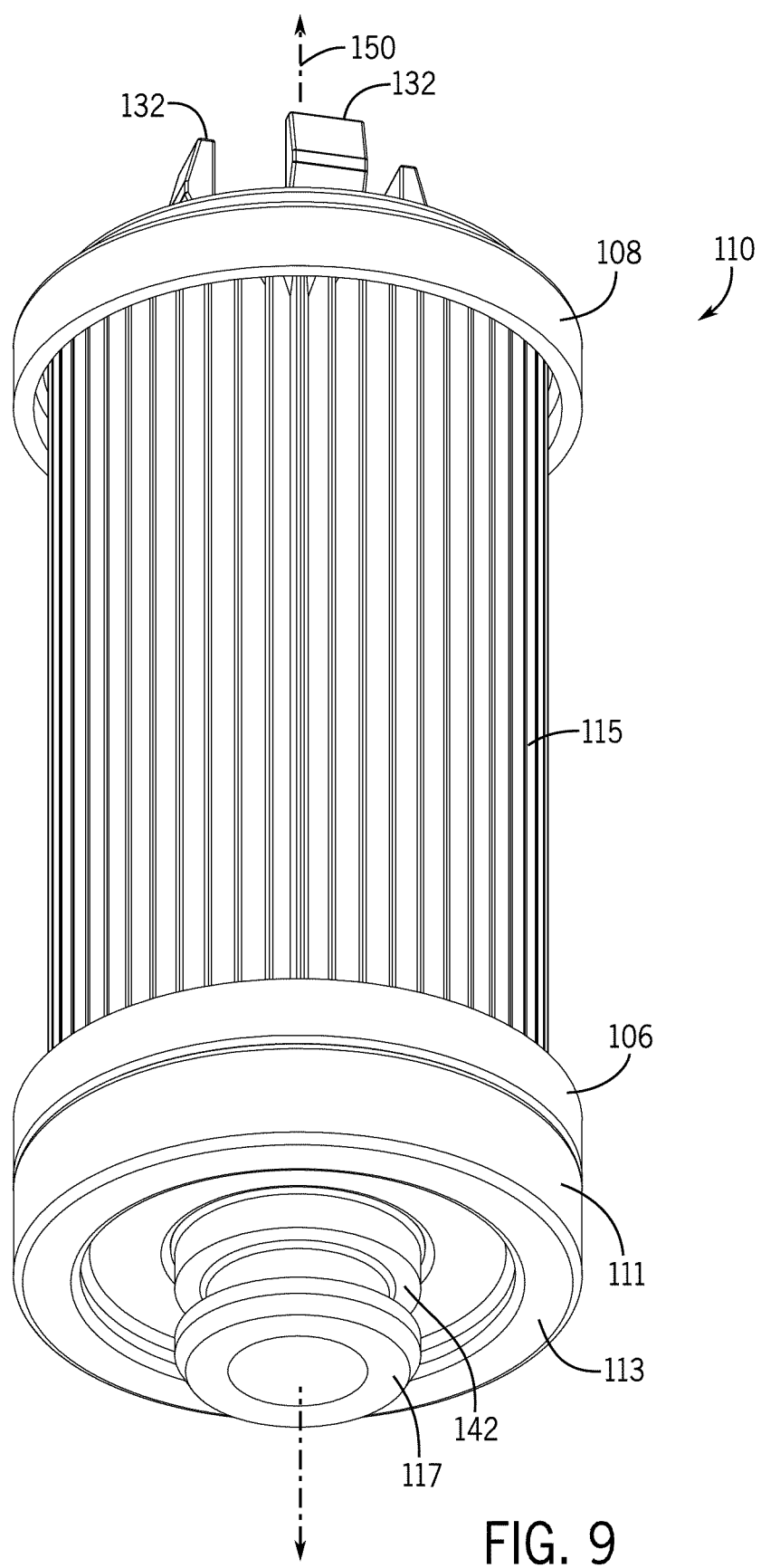
FIG. 9 is a bottom perspective view of the filter cartridge of FIG. 8.

Still referring to FIGS. 6-9, the filter cartridge 110 includes a baffle 144. The baffle 144 is positioned proximate the inlet 114 (e.g., covering the inlet 114). As shown in FIG. 7, the baffle 144 can include a protrusion 152 engaged with a slot 154 having a complimentary shape formed within the base 125. When the protrusion 152 is received within the slot 154, the baffle 144 remains stationary within the filter housing 104. The baffle 144 redirects dirty fluid entering the filter cartridge 110. As fluid is passed toward the filter cartridge 110, the baffle 144 redirects flow in a tangential direction to create a cyclonic flow around the filter media 115 (shown by arrows 160 in FIG. 7). Due to the cyclonic filtration of the incoming fluid, larger debris is separated from the incoming fluid prior to being filtered by the filter media 115. Larger debris that is cyclonically filtered from the incoming fluid drops out of the fluid and into a well 112 formed in the bottom of the filter housing 104. The well 112 traps the large debris in the bottom of the filter housing 104 such that the large debris is not re-entrained into the fluid. In some embodiments, a debris cover (not shown) positioned in the bottom of the filter housing 104 keeps the large debris within the well 112 so that the debris is not recirculated into the fluid. In addition, the trapping of the large debris within the filter housing 104 prevents unnecessary user concern due to seeing break-in debris and thinking the engine is wearing prematurely.

The filter cartridge 110 also includes a flexible portion 111 positioned on the bottom endplate 106. The flexible portion 111 alleviates potentially large vertical tolerance stack involved in installing the filter cartridge 110 securely into the filter housing 104. The flexible portion 111 also guides the filter cartridge 110 into the base 125 by interacting with one or more ribs 156 (shown in FIG. 7) formed in the base 125. Accordingly, the flexible portion 111 helps to align the filter cartridge 110 within the filter housing 104 such that the center projection 117 and gasket 142 are easily assembled into the base 125. When a user is installing the filter cartridge 110, the user may not be able to see the bottom portion of the filter cartridge 110 to align the filter cartridge 110 within the filter housing 104. The flexible portion 111 and ribs 156 help to guide the filter cartridge 110 into a properly installed position within the filter housing 104. The ribs 156 are formed such that the flexible portion 111 will contact the ribs 156 before the center projection 117 contacts the outlet opening 127 to prevent potential damage due to improper alignment.

The flexible portion 111 also acts as a closing mechanism for a drain valve assembly 120 positioned within the drain 118 in the base 125. The drain valve assembly 120 includes a valve member 121, a biasing member 122, a valve guide, and a retaining clip. The valve member 121 moves between a closed position and an open position. In the closed position, the valve member 121 is seated against seat 146 at valve surface 126 and prevents fluid from passing through the drain valve assembly 120. In the open position, the valve member 121 is unseated from seat 146 thereby creating a passageway through which fluid can flow and bypass the drain valve assembly 120. The drain valve assembly 120 is biased into the open position by the biasing member 122.

Accordingly, to achieve the closed position, the spring force of the biasing member 122 must be overcome. When the filter cartridge 110 is in the installed position, a bottom surface 113 of the flexible portion 111 contacts and presses downward on the valve member 121 to overcome the spring force of the biasing member 122 and move the drain valve assembly 120 into the closed position. When the filter cartridge 110 is removed from the filter housing 104, the flexible portion 111 moves out of engagement with the valve member 121 and the drain valve assembly 120 moves into the open position. Accordingly, when the filter cartridge 110 is removed from the filter housing 104, the drain valve assembly 120 is opened and any fluid within the cavity of the filter housing 104 can drain from the filter housing 104 into the drain 118. Once a user starts to remove the filter cartridge 110 by unscrewing the cover 102 from the housing 104, the drain valve assembly 120 is opened and the cavity is drained (along with any runoff from the filter cartridge 110), thus ensuring that the filter cartridge 110 is not pulled from a full reservoir of fluid when the filter cartridge 110 is removed.

In operation, fluid (e.g., oil) to be filtered flows from the engine 200 through the connection portion 172 of the base 125 (e.g., through inlet 114) and into the filter housing 104. To prevent leakage between the engine 200 and the connection portion 172 of the base 125, the connection portion may include a sealing member 184. The sealing member 184 may be a gasket or O-Ring that provides a fluid-tight seal between the connection portion 172 and the engine 200. The fluid enters the filter housing 104 through the inlet 114 and encounters the baffle 144. The baffle 144 redirects the fluid in a tangential direction, at which point the fluid is first cyclonically filtered around the filter media 115 within the space 124 between the filter media 115 and the filter housing 104, during which all larger debris is filtered from the dirty fluid. The larger debris is separated from the fluid and is collected in the well 112 at the bottom of the filter housing 104. The remaining fluid is then filtered through the filter media 115 in an outside-in flow arrangement (shown by arrows 175 in FIG. 6), and the cleaned fluid exits from the filter housing 104 through outlet 119 and is directed back to the engine (e.g., through connection portion 172, through outlet 119 formed in the connection portion 172).

Figure 10:
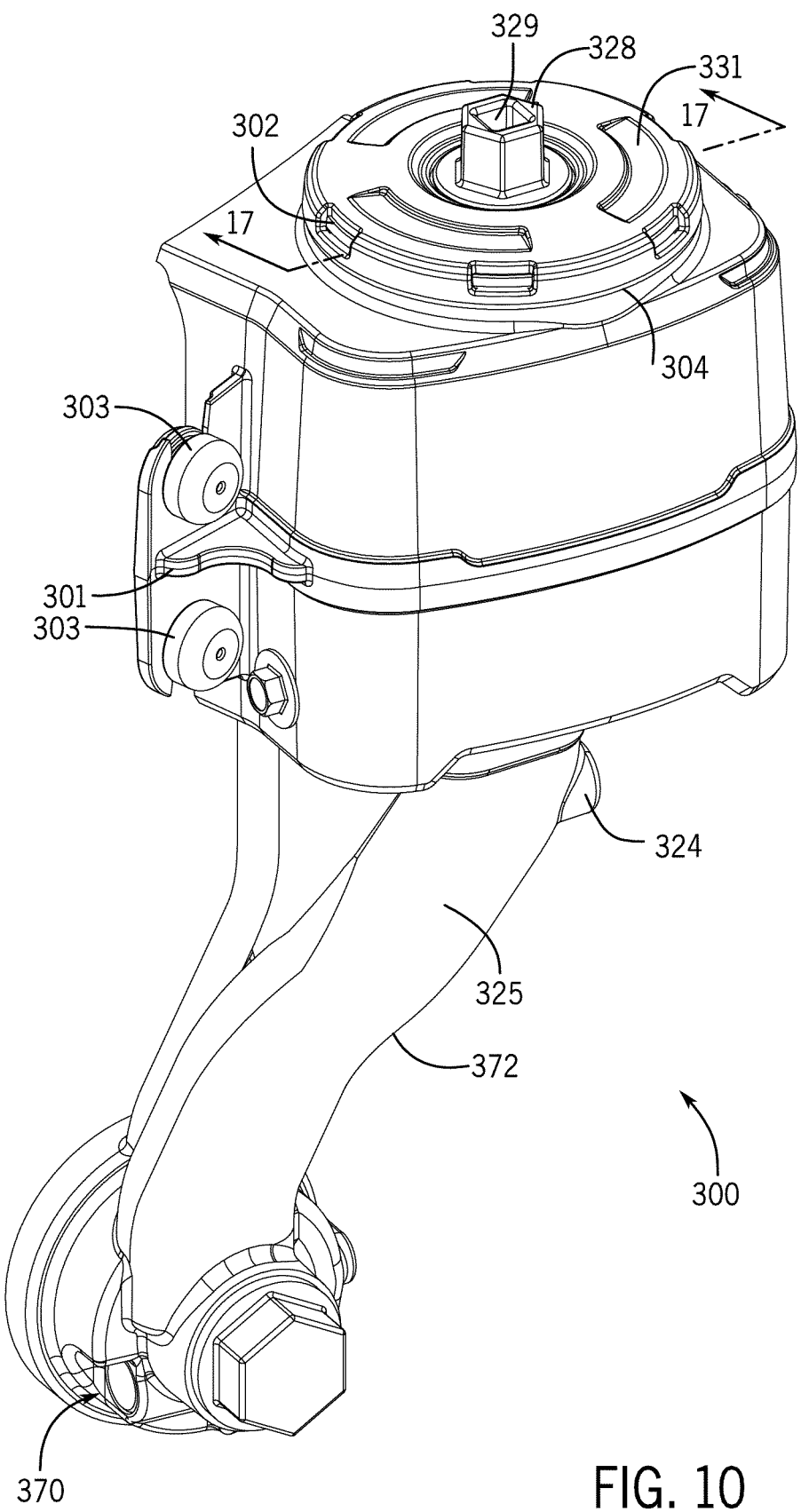
FIG. 10 is a perspective view of a filtration system, according to another exemplary embodiment.
Figure 11:
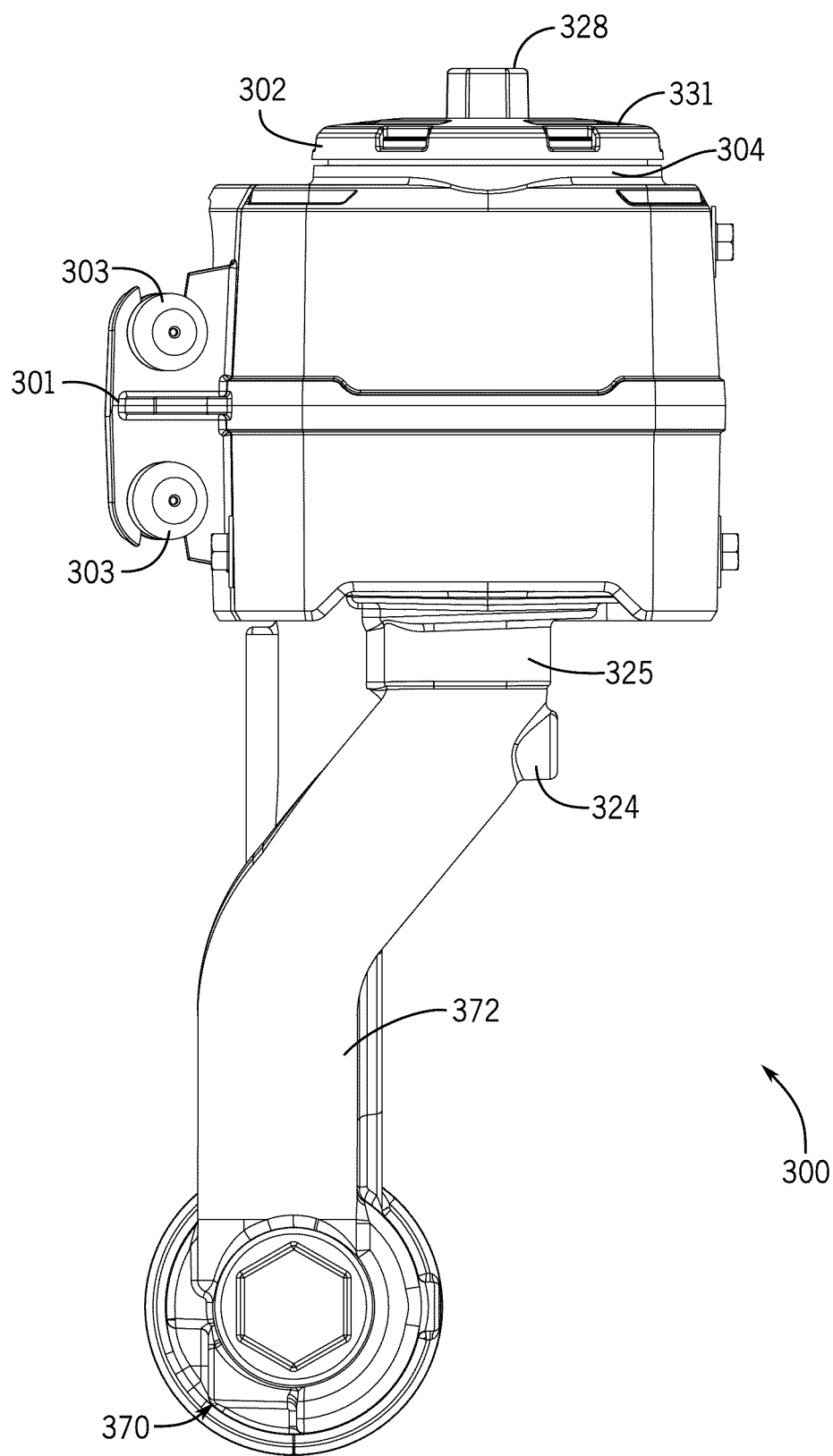
FIG. 11 is a front view of the filtration system of FIG. 10.
Figure 12:
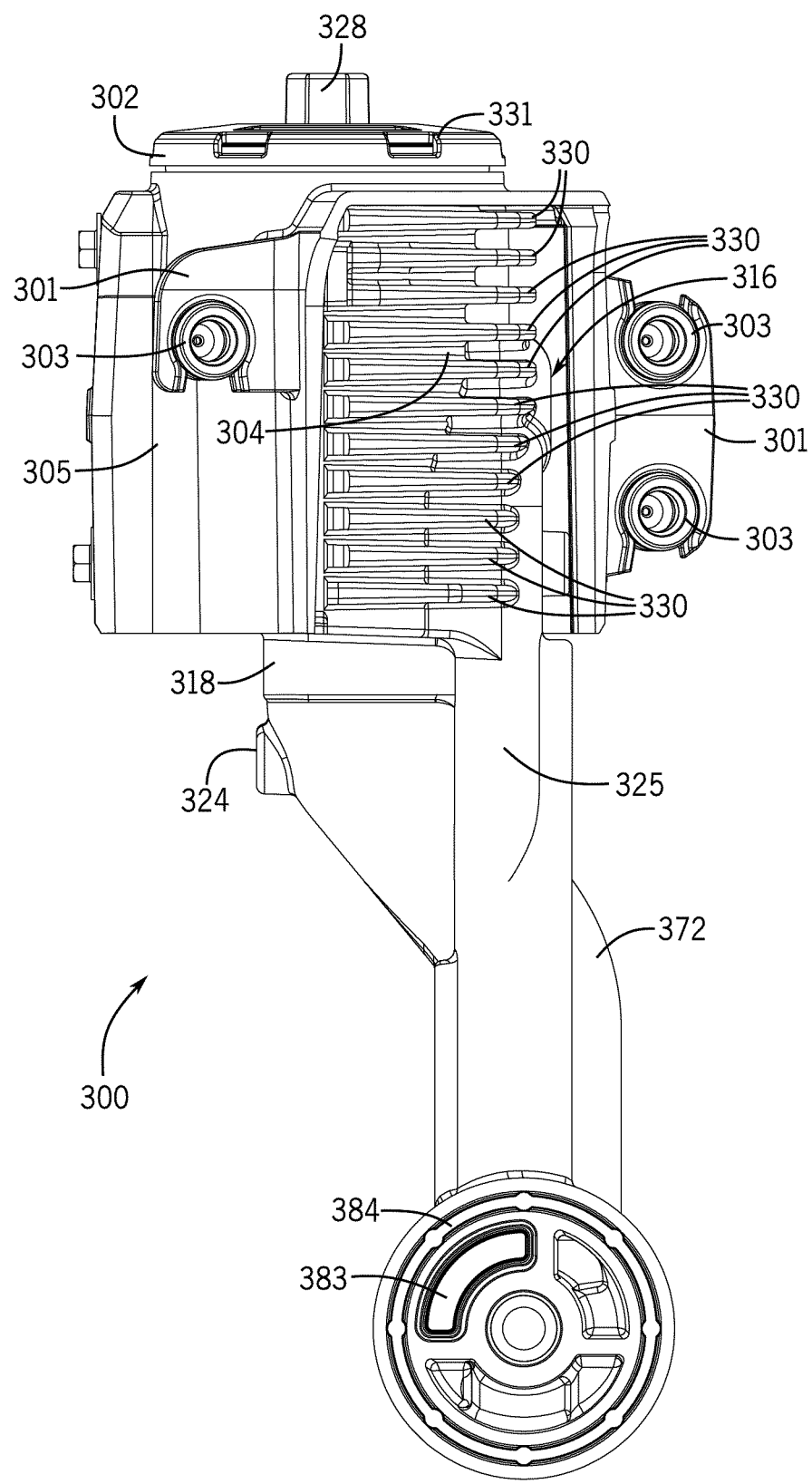
FIG. 12 is a rear view of the filtration system of FIG. 10.
Figure 14:
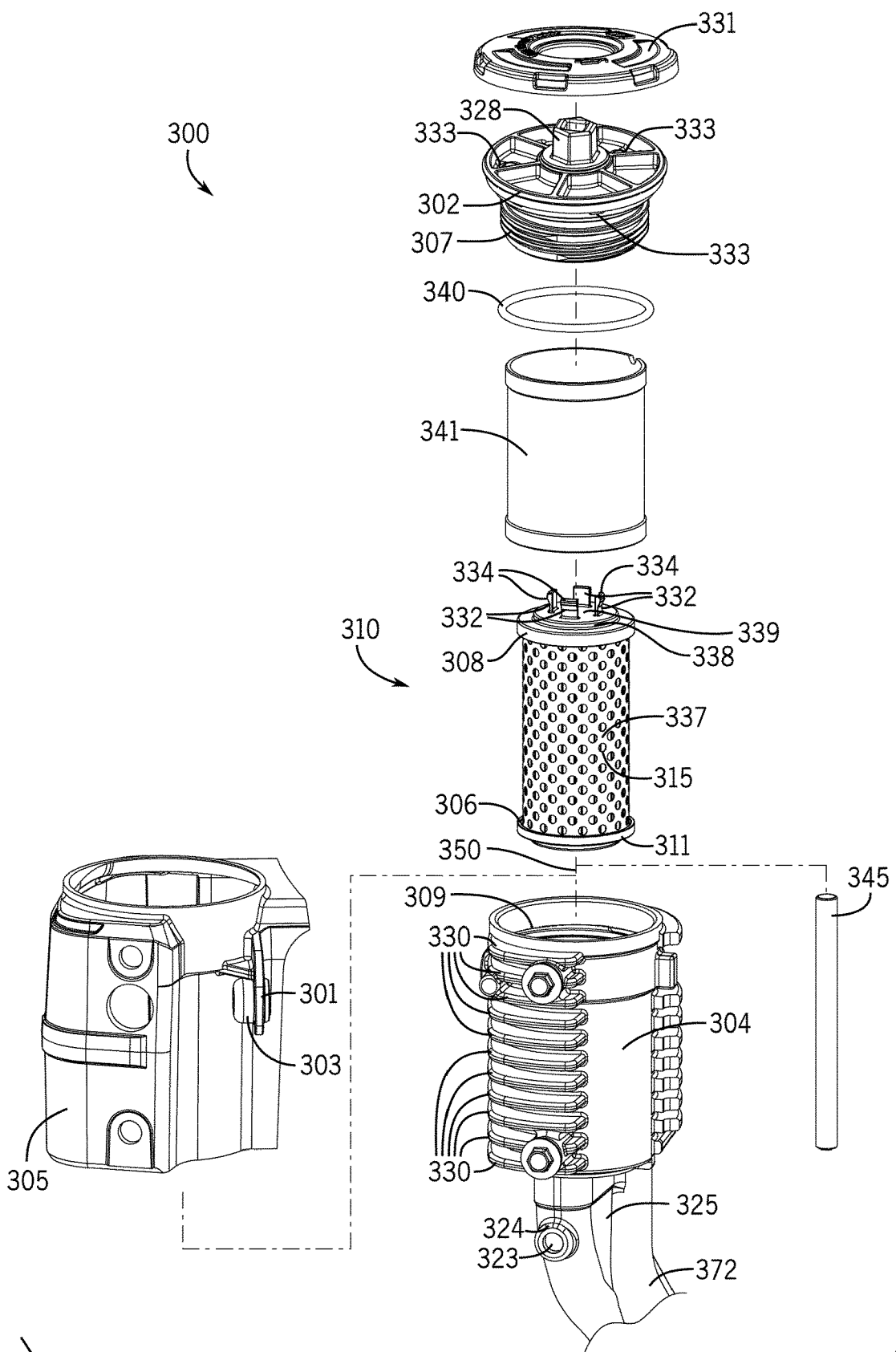
FIG. 14 is an upper exploded view of a portion of the filtration system of FIG. 10.

Referring now to FIGS. 10-12, the filtration system 300 is shown according to an exemplary embodiment. The filtration system 300 is similar to the filtration system 100 in many ways and similar reference numerals are used for similar or similarly functioning components. Similar to the filtration system 100, the filtration system 300 includes a filter housing 304 at least partially defined by a base 325 and a cover 302. The filter housing 304 is configured to receive and direct oil or other fluid through a filter cartridge 310 (see FIG. 14) received within the filter housing 304 and then back out of the filter housing 304. By passing the oil through the filter cartridge 310, contaminants can be removed from the oil before it is passed back into the engine 200. Because these contaminants might otherwise cause unnecessary wear and friction within the engine, removing contaminants from the oil extends the life of the engine 200.

The base 325 of the filtration system 300 includes additional features to help direct flow through the filter housing 304 and improve the filtration of the system. As depicted in FIG. 12, the base 325 further includes and supports a boss 324, a pin plug 323 located within the boss 324, a screen or filter 383, and a sealing member 384. The boss 324 protrudes from the base 325 and receives and supports the pin plug 323. The pin plug 323 extends into a fluid flow path through the base 325 to contact and/or disrupt the flow of at least one of the incoming fluid and the outgoing fluid. The pin plug 323 partially obstructs the flow path, which helps create turbulence that transforms the fluid flow within the base 325 from laminar flow to turbulent flow. The turbulent nature of the flow mixes air trapped in the filtration system 300 with the outgoing fluid and/or the incoming fluid to force the trapped air outward from the filtration system 300 with the filtered fluid. Mixing the air into the fluid pushes the air through the filtration system 300 and into the engine 200, rather than through gaps within the filter cartridge 310 or filter housing 304 that might otherwise impact fluid flow. Once in the engine 200, the air can then easily escape through a pressure relief or breather system of the engine. In some embodiments, the filtration system 300 may include other types of plugs (e.g., a ball plug) in place of the pin plug 323. Alternatively, the base 325 may include an integral piece (e.g., is cast as a part of the base 325) that disrupts the flow of at least one of the incoming fluid and the outgoing fluid and transforms the fluid flow from laminar to turbulent flow. The screen 383 provides additional filtering to at least one of the incoming fluid and the outgoing fluid. The sealing member 384 may be an O-ring or other kind of sealing member and provides a seal between the filtration system 300 and the sump and/or oil filter line. The sealing member 384 can prevent fluid leaks outward from the filtration system 300 while also blocking air from entering the filtration system 300 and/or the engine 200 during operation of either.

Figure 13:
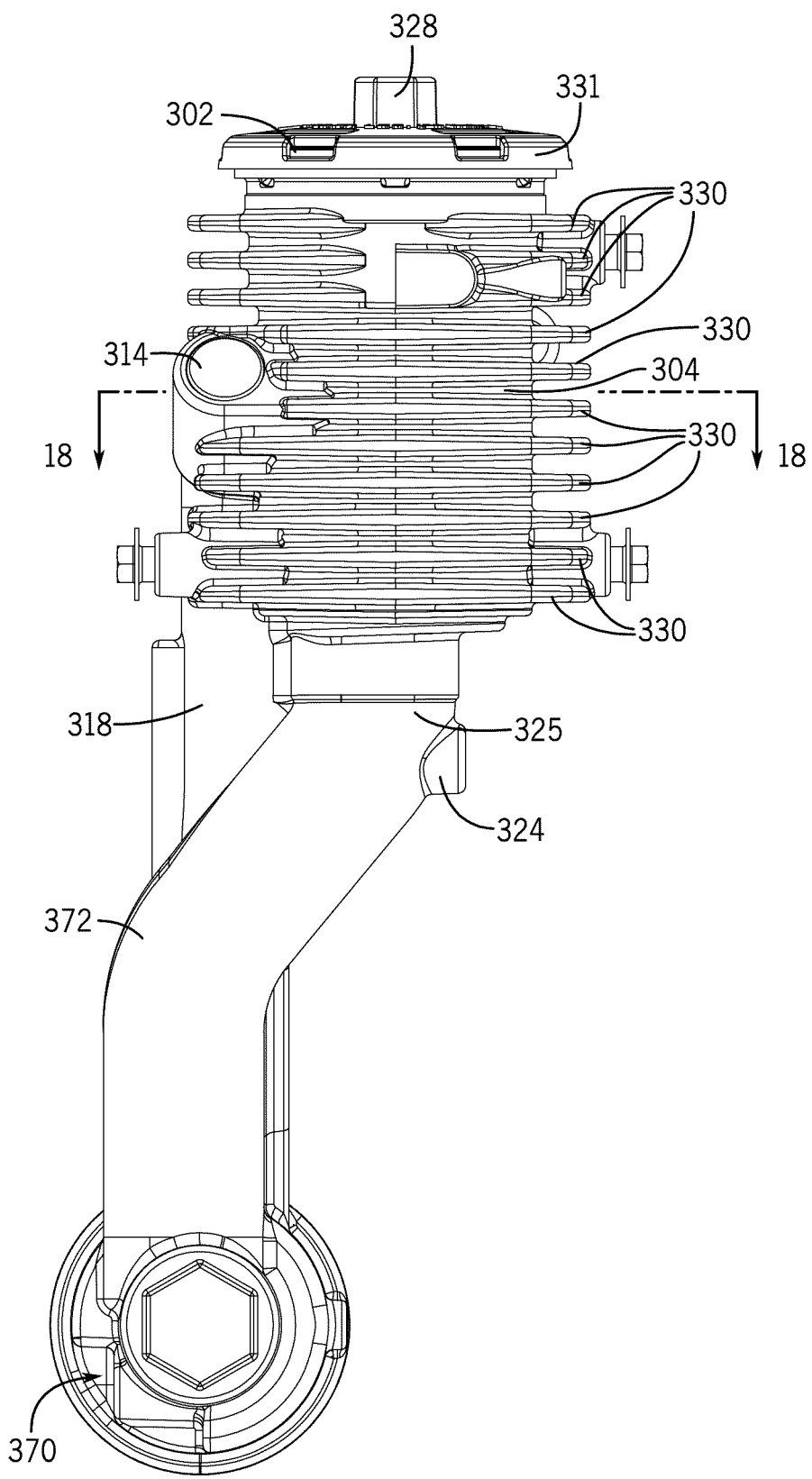
FIG. 13 is a front view of a portion of the filtration system of FIG. 10.

With additional reference to FIG. 13, the heat transfer components of the filtration system 300 are shown. The filtration system 300 includes multiple fins 330 that extend horizontally from the base 325 and provide additional cooling to the filtration system 300. The fins 330 wrap circumferentially around the base 325 and extend radially outward from the base 325. The fins 325 provide additional surface area for cooling air to pass over and remove heat from the base 325 and the fluid passing through the base 325. The fins 330 may take a variety of shapes but are shown to be thin. The heat shield 305 extends around the fins 330 to prevent accidental contact with the fins 330 and to help direct cooling air around the base 325. Additionally, the heat shield 305 and filter housing 304 are positioned proximate a cooling air discharge near the blower housing of the engine 200. The cooling air may exit through a window in the blower housing. When assembled, a gap 316 is formed between the heat shield 305 and the filter housing 304. The heat shield 305 partially surrounding the filter housing 304 directs the cooling air over the fins 330 within the gap 316 and allows the air to escape after the air has circumnavigated the filter housing 304 at least once. The heat shield 305 helps to cool the filter housing 304 and the fluid being filtered therein, thereby extending the life of the filter cartridge 310 and the time period between filter changes.

Figure 15:
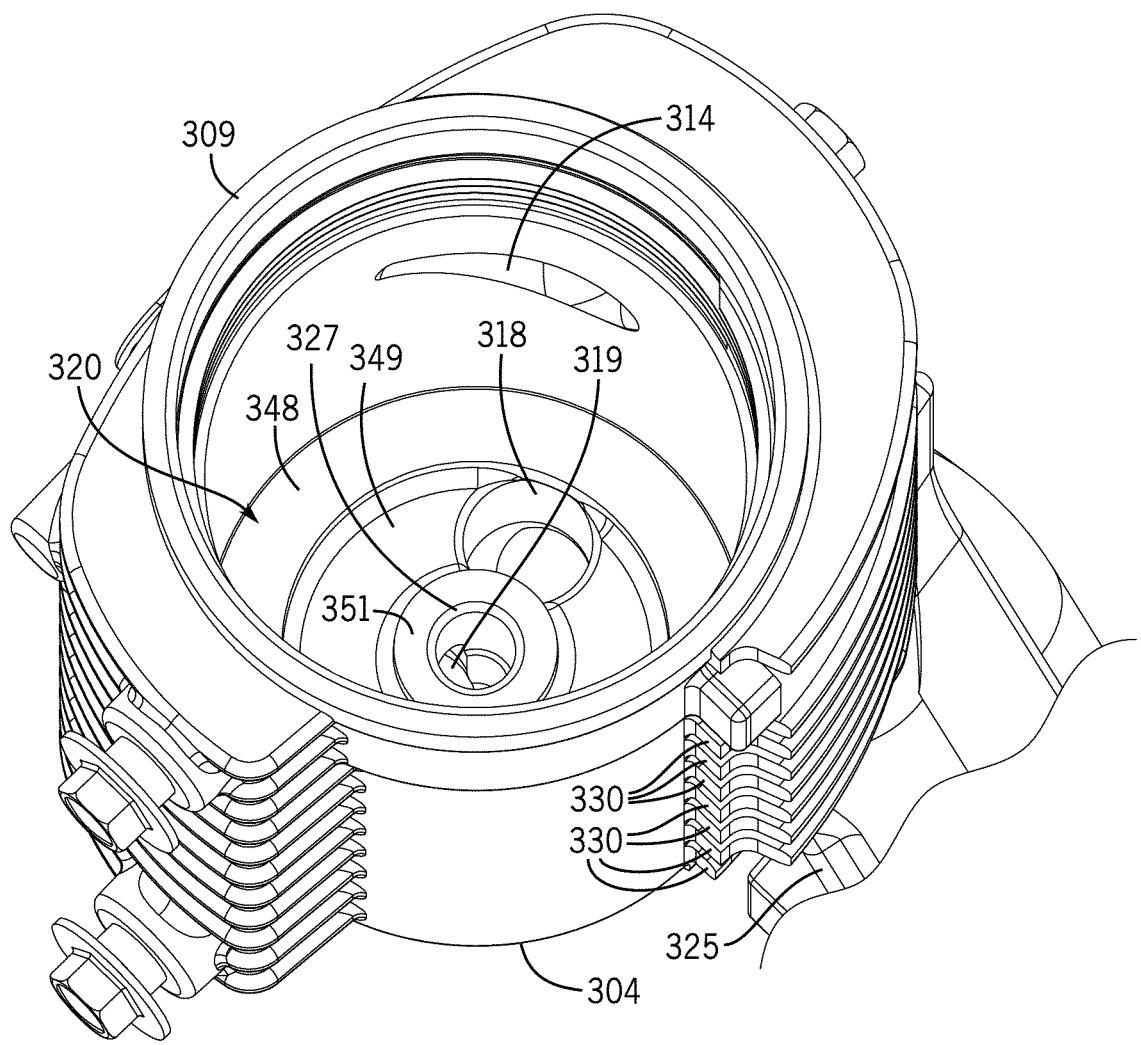
FIG. 15 is an upper interior view of the base of the filtration system of FIG. 10.
Figure 16:
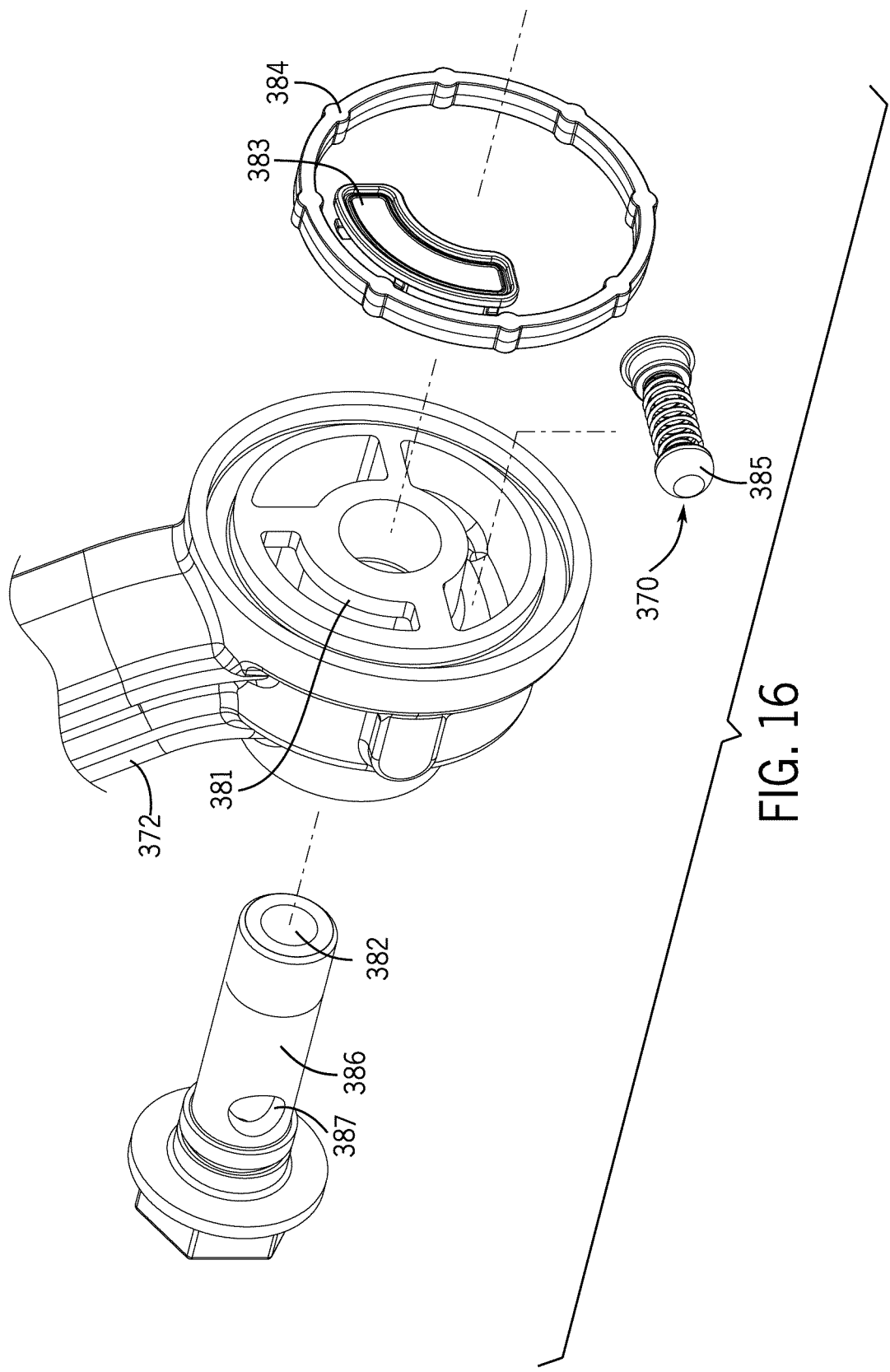
FIG. 16 is a lower exploded view of a portion of the filtration system of FIG. 10.
Figure 17:
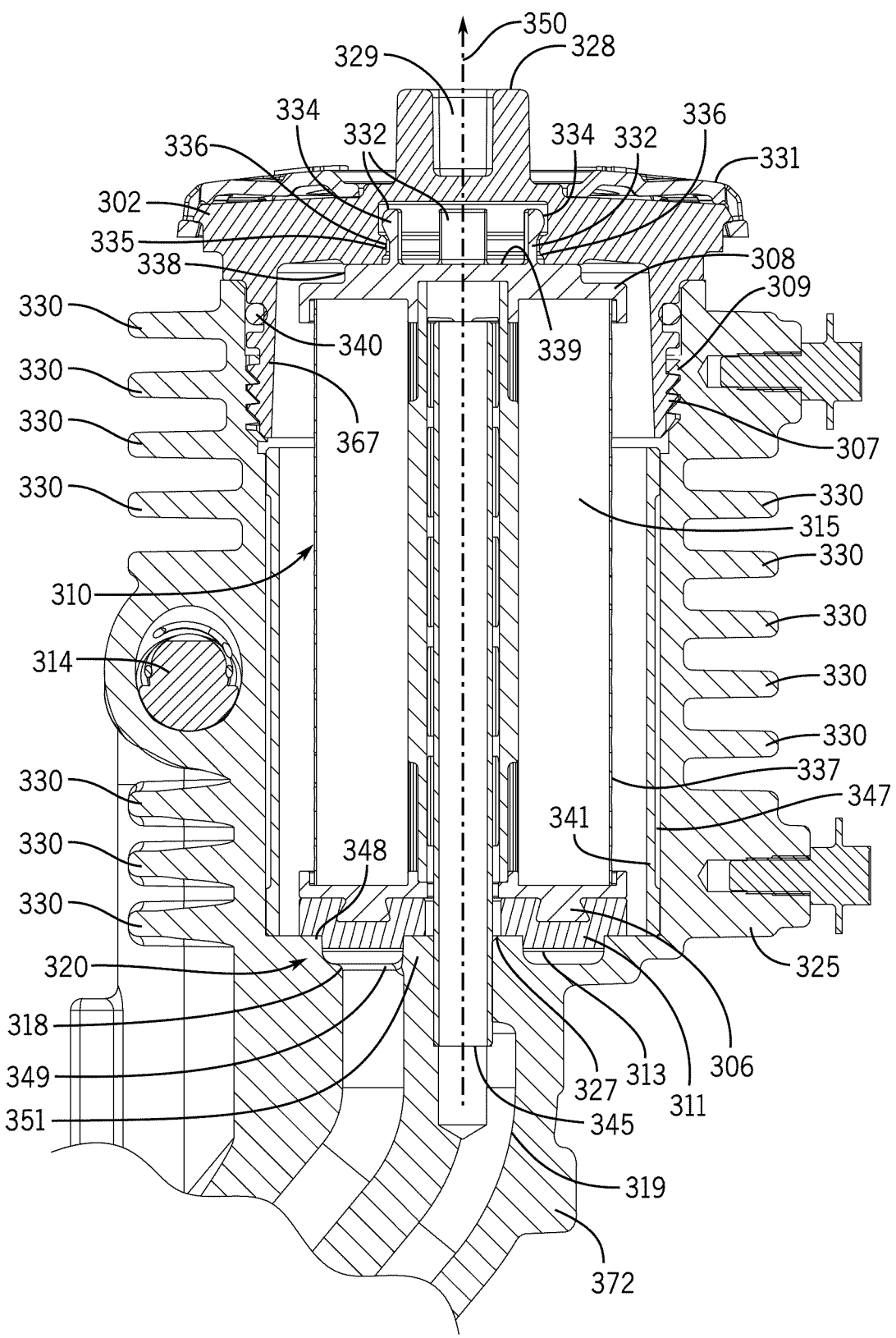
FIG. 17 is a cross-sectional view of a portion of the filtration system of FIG. 10, taken along line 17-17 in FIG. 10.
Figure 18:
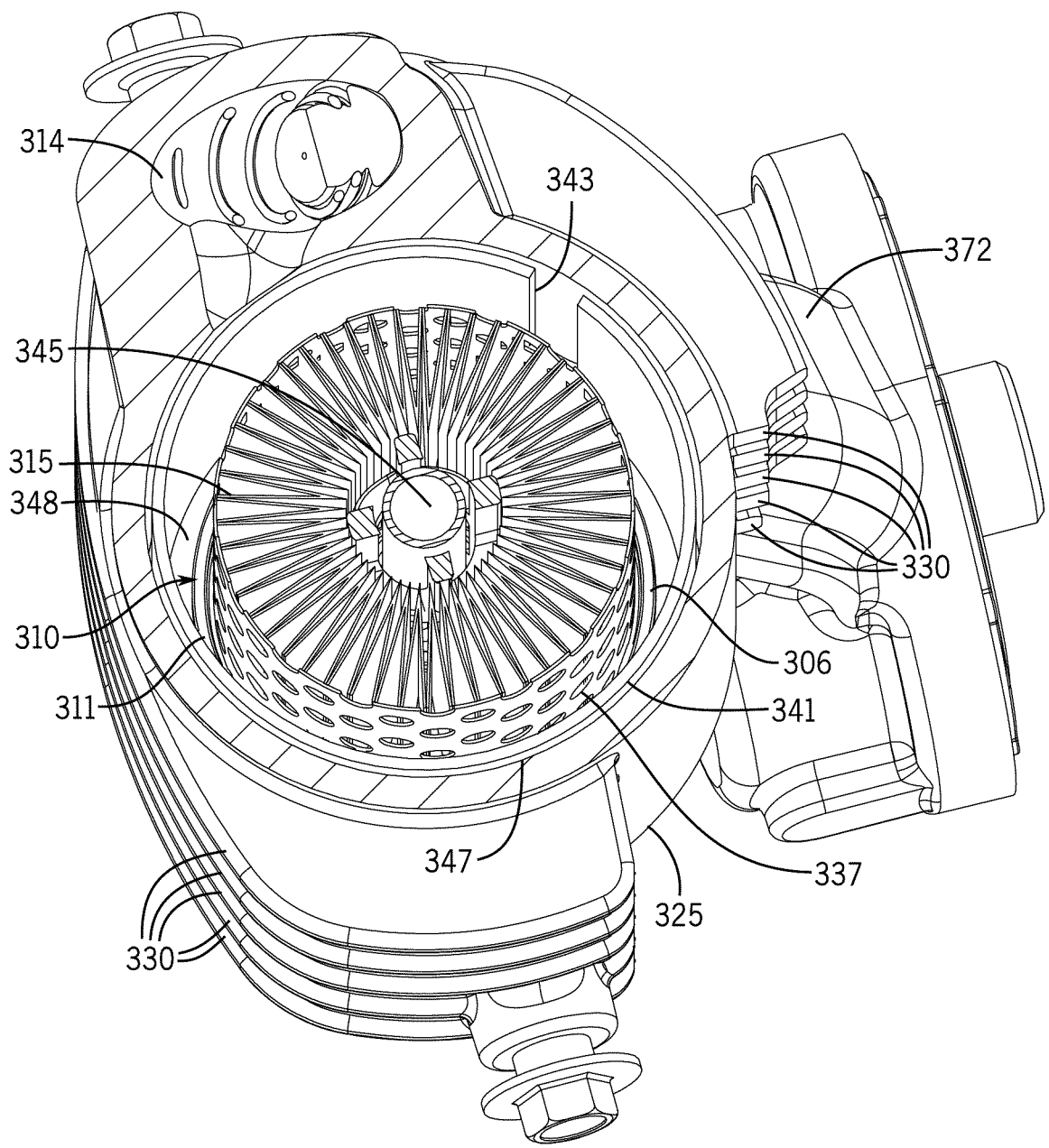
FIG. 18 is a perspective cross-sectional view of a portion of the filtration system of FIG. 10, taken along line 18-18 in FIG. 13.

Referring now to FIGS. 14-18, the structure and interaction between components of the filtration system 300 are depicted in additional detail. The cover 302 is removably coupled to the base 325. As shown in FIGS. 15 and 17, the cover 302 includes a sealing member 340 and threads 307 that can be received by the second threads 309 formed within the base 325 to removably couple the cover 302 to the base 325. The threads 307 can be coupled to the threads 309 by rotating the cover 302 clockwise, for example. Using a threaded connection, a seal is formed between the cover 302 and base 325. Because the cover 302 further includes the sealing member 340, the seal between the cover 302 and the base 325 is fluid-tight. In some embodiments, the cover 302 may include two or more sealing members 340. To help facilitate the threadable coupling between the cover 302 and the base 325, the cover 302 can include a drive 328. In some examples, the drive 328 is an external square or hex drive that includes an internal square drive 329 formed in the drive 328. Accordingly, various different tools (e.g., a wrench, square-drive bit, etc.) can be used to help torque the cover 302 onto or off of the base 325. In some examples, the internal square drive 329 is a common drive that is configured to be tightened or loosened via a wrench or a socket. In some embodiments, the socket size may be universal between standard and metric (e.g., ¾ inch, 19 mm). Accordingly, a user can open the filtration system 300 via the cover 302 using either a metric socket or a standard socket set and may be able to access the internal components of the filtration system 300. The cover 302 also includes an identifier covering 331 that includes identifying information (e.g., part number, installation date) relating to the filtration system 300 or filter cartridge 310. In some examples, the identifier covering 331 can be a yellow covering that may indicate to a user of the engine and the filtration system 300 that this is the oil cap. In other embodiments, the identifier covering 331 may further include specifications (e.g., oil reservoir volume, required torque to seal the cover 302, operating temperature of the filtration system 300, etc.) relating to the filtration system 300 and/or the engine 200 on which the filtration system 300 is operating. In other embodiments, the cover 302 may be removably coupled to the base 325 via a non-threaded engagement (e.g., quarter turn).

The cover 302 includes additional features to help prevent contaminant buildup within the filter housing 304. For example, the cover 302 includes the sealing member 340 (e.g., an O-ring). The sealing member 340 helps to prevent fluid from leaking upwardly and outwardly from the filtration system 300, while simultaneously blocking contaminants from entering into the filter housing 304. Additionally, debris holes 333 can be formed through the cover 302. The debris holes 333 are positioned along an outer rim of the cover 302 and create passages through portions of the cover 302 that extend radially outward from the filter cartridge 310 and radially outward from the base 325. The debris holes 333 allow debris and other fluids that may fall on the cover 302 (e.g., rain) to empty from or leave the cover 302 without pooling. The debris openings 333 extend through the cover 302 and empty into the gap 316, which allows the debris to travel alongside, rather than within the base 325 until it exits the filtration system 300 altogether. If the filtration system 300 (and/or the associated engine 200 and outdoor power equipment) is operating in or otherwise left outdoors, precipitation may accumulate on the filtration system 300. For example, rain may begin to collect on the cover 302, but due to the debris openings 333, the rain will pass beyond the cover 302 and empty into the gap 316 and away from the filtration system 300. The cover 302 further includes a retainer 336 formed as a ledge within a central opening 335 of the cover 302. The ledge is formed within and extends radially inward (e.g., toward and into the central opening 335) from the underside of the cover 302. The central opening 335 is formed as a bore that is centrally located on the underside of the cover 302.

Like the cover 102, the cover 302 includes a cup 367. The cup 367 extends downward substantially axially and at least partially along the length of the filter cartridge 310, above a sleeve 341. The cup 367 at least partially surrounds the filter cartridge 310 and defines a fluid reservoir. As explained above with respect to the filter cartridge 110, when the cover 302 and filter cartridge 310 are simultaneously removed from the filter housing 304 (e.g., from the base 325), a user can turn the assembly upside down such that fluid dripping from or otherwise still remaining within either the filter cartridge 310 or cover 302 is captured within the fluid reservoir of the cup 367. The cup 367 extends away from the underside of the cover 302 and is positioned radially outward from the filter cartridge 310 to better capture dripping fluid. Accordingly, the cup 367 helps reduce the potential mess of removing and replacing the filter cartridge 310.

The filtration system 300 further includes the filter cartridge 310. The filter cartridge 310 includes a mesh or mesh screen 337 extending around and forming a portion of the outer perimeter of the filter cartridge 310. The mesh 337 includes multiple holes through which the fluid may enter and reach the filter media 315 (inside of the mesh 337). The holes within the mesh perform an initial filtering function by preventing large contaminants from entering inward toward the filter media 315 as fluid passes into the filter cartridge 310. Additionally, the mesh 337 provides structural support to several components of the filter cartridge 310.

Similar to the filter cartridge 110, the filter cartridge 310 has a generally cylindrical shape extending along a longitudinal axis 350 between a top endplate 308 and a bottom endplate 306. The filter cartridge 310 further includes a flexible portion 311 that is coupled to the bottom endplate 306. The top endplate 308 is coupled to the filter media 315 and includes multiple protrusions 332. Filter media 315 extends between the bottom endplate 306 and the top endplate 308. The protrusions 332 are formed of a resilient material and include tabs 334 which interact with the retainer 336 of the cover 302. The interaction between the tabs 334 and the retainer 336 creates a removable coupling between the filter cartridge 310 and the cover 302. The tabs 334 may extend radially outward from the protrusions 332 and radially outward from the retainer 336. The resilient nature of the protrusions 332 allows the protrusions 332 and tabs 334 to flex as they are pressed into contact with the cover 302 during the coupling process. Continued axial force causes the protrusions 332 and tabs 334 to flex inwardly until the tabs 334 have been pushed past the retainer 336. Once the tabs 334 have passed axially beyond the retainer 336 and into the central opening 335, the protrusions 332 relax and resiliently return outward. The tabs 334 then engage and at least partially overlap the retainer 336, which creates a removable coupling between the filter cartridge 310 and the cover 302. The coupling formed between the cover 302 and the filter cartridge 310 allows the cover 302 and filter cartridge 310 to be removed from the base 325 simultaneously. The coupling between the filter cartridge 310 and cover 302 facilitates quick removal and replacement of the filter cartridge 310 in which the user does not need to physically handle the filter cartridge 310 to remove the filter cartridge 310 from the base 325.

FIGS. 14-18 show the fluid flow paths through the interior of the base 325. As shown, the base 325 includes an inlet 314, a drain 318, and an outlet 319 beginning at an outlet opening 327, all of which are fluidly coupled to the engine 200 and configured to handle fluid as it is passed through the filtration system 300. In operation, fluid is received by the inlet 314 at or near the bottom of the connection portion 372 of the base 325. For example, the fluid can be received from a sump of the engine 200 through a fluid entrance 381. The fluid entrance 381 forms and defines a portion of the inlet 314 and/or is fluidly coupled to the rest of the inlet 314. The fluid entrance 381 can include and receive a screen 383. The screen 383 (which can be a filter, for example) serves as an initial filter to capture and remove debris (e.g., metal shavings, particles, dirt, grime, etc.) out of the fluid before the fluid enters the inlet 314. By placing the screen 383 within the flow path toward the inlet 314, fluid is physically filtered twice (e.g., once by the screen 383 and again by the filter media 315) before being passed back into the engine 200. The two-stage filtration process extends the life of the filter media 315 by limiting the amount of larger, potentially harmful debris from entering into the filtration system 300 altogether. Accordingly, the filter media 315 can operate for longer periods of time, and also helps in reducing the frequency of oil changes or fluid changes. Once the fluid enters the fluid entrance 381, the fluid travels through the inlet 314 of the connection portion 372 and enters the interior of the base 325.

Once the fluid has entered the interior of the base 325, the fluid reaches a sleeve 341. When the filtration system 300 is assembled onto the engine 200, the sleeve 341 is located within the base 325 between the inlet 314 and the filter cartridge 310. The sleeve 341 (e.g., an exterior of the sleeve 341) and the base 325 (e.g., an interior of the base 325) together define a small pocket or gap 347 (seen in FIG. 17) that can be used to affect flow velocity through the filter housing 304. During engine 200 operation, pressurized fluid enters the base 325 through the inlet 314 and is pushed around the sleeve 341, into and through the gap 347. The speed of the flow through the gap 347 can be controlled by the size of the gap 347 (i.e., the difference between the outer diameter of the sleeve 341 and the inner diameter of the base 325). For example, the gap 347 can be between approximately 0.001-0.1 inches in width. The minimal width of the gap 347 can increase the speed of the fluid flow through the gap 347, which may provide for additional heat transfer between the fluid and the base 325 to help cool the fluid. Removing heat from the fluid can be important, as oil is known to degrade based on the average temperature of the oil. By increasing the heat transfer between the fluid and the base 325, the average temperature of the oil is thereby reduced and the oil life is increased. According to some examples, the filtration system 300 allows the oil to operate for at least 500 hours (as compared to the average operating length of 100 hours in small engines). In another example, the filtration system 300 allows the oil to operate for at least 250 hours.

When installed in the base 325, the sleeve 341 extends from at or near the bottom of the base 325 to a position proximate the threads 309. The position and shape of the sleeve 341 is such that fluid entering the base 325 is directed around the sleeve 341 and through the gap 347. Additionally, a slot 343 (shown in FIG. 18) is formed in the sleeve 341. The slot 343 provides an entrance into an interior of the sleeve 341, which allows fluid to enter inward into the filter cartridge 310 from the base 325. The slot 343 creates fluid communication and defines a fluid flow path between the interior of the sleeve 341, the gap 347, and the inlet 314. In some embodiments, the slot 343 is located approximately 180 degrees angularly offset (about the longitudinal axis 350) from the inlet 314. In another embodiment, the slot 343 is angularly offset by 270 degrees (clockwise or counterclockwise) from the inlet 314. In another embodiment, the slot 343 is angularly offset by approximately 350 degrees (clockwise or counterclockwise) from the inlet 314. In some examples, the base 325 and/or the sleeve 341 include a blocking surface extending into the gap 347 that directs the fluid to flow around the sleeve 341 in one direction (e.g., clockwise or counterclockwise). In some embodiments, the rotational flow imparted by the sleeve 341 may allow the filtration system 300 to further filter the fluid using cyclonic filtering (e.g., similar to the filtration system 100).

The fluid is then directed through the holes of the mesh 337, into and through the filter media 315. The filter media 315 may be similar to the filter media 115 and be made of a variety of components including paper, synthetic fibers, plastic, or various other materials designed for the specified fluid or oil. The filter media 315 filters the fluid to remove additional or smaller debris that the screen 383 and the cyclonic filtering of the base 325 did not capture. Once the fluid has passed through the filter media 315, it travels towards the top of the base 325.

As shown in FIG. 17, the filtration system 300 further includes the stand pipe 345. The stand pipe 345 is located within the center of the filter cartridge 310. The stand pipe 345 is press fit into the base 325 and is fluidly coupled to the outlet 319. The stand pipe 345 is centrally located within the filter media 315 and the filter cartridge 310, generally, and defines the primary fluid flow path to the outlet 319, thereby providing a fluid path from the interior of the filter media 315 to the outlet 319. The pipe 345 can also act as a guide for the filter media 315 during installation. For example, a user may be changing their engine oil and replacing the filter cartridge 310. To begin the changing process, the user removes the cover 302 and filter cartridge 310, which is coupled to the cover 302. Because the filter media 315 (and the filter cartridge 310) is not coupled to the pipe 345, the stand pipe 345 does not move when the filter media 315 is removed. The stand pipe 345 is press fit into the outlet 319 and remains stationary. Once the user installs a new filter cartridge 310 into the cover 302, the filter cartridge 310 and cover assembly 302 are reinstalled into the filter housing 304. The stand pipe 345 is centrally located and provides a guide that can enter into the filter media 315 to help center the filter cartridge 310 into position within the filter housing 304. The filter cartridge 310 can be pushed downward until the flexible portion 311 engages the base 325. As described above, the pipe 345 is received by the filter cartridge 310 and extends axially toward the cover 302. As shown in FIG. 17 and when fully installed, an inlet opening 392 of the pipe 345 is located proximate the top endplate 308. Accordingly, the pipe 345 fluidly couples an interior of the filter media 315 to the outlet 319.

The stand pipe 345 helps the filtration system 300 to remove air that is located within the fluid, the engine 200, or the filtration system 300. Because air is less dense than some fluids used within the filtration system 300, air may naturally accumulate at or near the top of the base 325 and top end plate 308. As the air builds up over time, the air might otherwise interfere with fluid flow within the filtration system 300 and may prevent the filtration system 300 from operating correctly (e.g., air may cause the filtration system 300 to operate with low levels of fluid or when not full of fluid). The pipe 345, with an entrance near the top of the base 325, naturally expels air from the fluid being filtered by the filtration system 300. To leave the base 325, fluid must reach the outlet 319 through the pipe 345 (unless the bypass valve 370 is opened, as discussed below). Because there is limited clearance between the top of the pipe 345 and the top endplate 308, any air that is trapped near the top endplate 308 is naturally pushed through the pipe 345 and out the outlet 319. Once downstream of the filter cartridge 310, the air can then be expelled through an air outlet of the filtration system 300 or through the engine (e.g., through a breather system of a crankcase of the engine). Accordingly, the filtration system 300 can better remove air from the working fluid within the filtration system 300.

Still referring to FIGS. 14-18, the base 325 further defines and/or includes a drain assembly 320. The drain assembly 320 includes a first raised surface or bottom 348, a second raised surface or bottom 351, a trough or channel 349, the drain 318, and the flexible portion 311. The drain assembly 320 may omit a valve (e.g., the valve member 121, the biasing member 122, etc.). The drain assembly 320 is configured to empty the base 325 of fluid when the cover 302 is removed from the base 325. The flexible portion 311 includes an outer diameter larger than the outer diameter of the channel 349. Accordingly, when the cover 302 is removably coupled to the base 325, the flexible portion 311 is in contact with the first bottom 348 and the second bottom 351. The flexible portion 311 then covers the channel 349 and the fluid, which is above and around the flexible portion 311, cannot flow into the channel 349 to reach the drain 318. When the cover 302 is decoupled and removed from the base 325, the filter cartridge 310 is also removed. By removing the filter cartridge 310, the flexible portion 311 no longer covers the channel 349 and fluid is allowed to flow into the channel 349, downward into and through the drain 318. As a result, the base 325 is then relatively empty of fluids when the user is accessing the filter cartridge 310. In some embodiments, the drain 318 is fluidly coupled to the outlet 319 and the fluid exits the filtration system 300 when the drain assembly 320 is opened. In another embodiment, the drain is 318 is fluidly coupled to the inlet 314 and the fluid is recirculated within the filtration system 300 when the drain assembly 320 is opened. In other embodiments, the drain 318 is directly fluidly coupled to the engine 200. The drain assembly 320 is then movable between an open position (e.g., where fluid can drain through the drain assembly 320 to reach the engine 200) and a closed position (e.g., where fluid cannot drain through the drain assembly 320 to reach the engine 200) depending on whether the filter cartridge 310 is present.

Advantageously the drain assembly 320 can also be used to fill the sump or crankcase cover of the engine 200 during fluid changes or oil changes. For example, the user may be changing their oil and installing a new oil filter (e.g., a new filter cartridge 310). To do so, the user may first remove the cover 302 from the base 325, and the fluid (oil) may return to the sump of the engine 200 via the drain assembly 320 and the drain 318. At this point, the user may empty the sump of the old fluid or oil using an oil drain valve or oil drain port. In some embodiments, the filtration system 300 may further include a drain port through which the user can also drain the old fluid or oil from the sump of the engine 200. Once the old oil has been removed from the sump, the user may add new oil to the sump of the engine 200 via the drain assembly 320. As the drain 318 is fluidly coupled to the sump, the new oil flows through the drain 318 and is stored in the sump. Then, the user may install a new filter cartridge 310 onto the cover 302 and couple the cover 302 to the base 325. The quick connection and sub-assemblies of the filtration system 300 provide a mechanism through which the user may change their oil and oil filter in a relatively clean and quick manner. Additionally, because the user can access the filter cartridge 310 and fill the oil from the filtration system 300, the user does not need to work from two separate areas to change the oil (i.e., by filling the oil at a first location and changing the filter cartridge at a second location).

Referring to FIG. 16, the connection portion 372 of the base 325 further includes a bolt 386. The bolt 386 extends into and through the connection portion 372 (e.g., by the fluid exit 382) to mount the base 325 onto the engine 200 (e.g., to the sump). In some embodiments, at least a portion of the bolt 386 includes threads that can be used to removably and securely couple the base 325 to the engine 200. The bolt 386 also defines a fluid flow path that passes through the bolt 386. When the bolt 386 (and base 325) is coupled to the engine 200, an interior of the bolt 386 is fluidly coupled to the engine 200. In operation, fluid travels from the outlet 319, into an interior of the bolt 386 (e.g., along a longitudinal axis of the bolt after passing through a transverse passage 387 formed in the bolt 386), and to the engine 200. In addition to fluidly coupling the outlet 319 to the engine 200, the bolt 386 provides structural support to the connection portion 372. As the bolt 386 extends through the bottom portion of the connection portion 372 and into the engine 200, the bolt 386 receives and supports at least a portion of the weight of the filtration system 300 during operation.

With continued reference to FIG. 16, the bolt 386 defines a central fluid passage leading to a fluid exit 382 formed at one end of the bolt 386. In operation, filtered fluid leaves the upper portion of the base 325 through the outlet 319. The filtered fluid continues downward toward the connection portion 372, where it is supplied into the transverse passage 387 formed through the bolt 386. Fluid enters the central fluid passage within the bolt 386 and travels outward, to the engine 200 through the fluid exit 382. In some embodiments, the fluid exit 382 is fluidly coupled to an oil pump of the engine 200 that then supplies the filtered fluid or oil to the crankcase or sump of the engine 200. In other embodiments, the oil is provided to the sump or crankcase of the engine 200 (which may include an oil spreader). Accordingly, the fluid exit 382 is fluidly coupled with one or more components of the engine 200. When the lower portion of the connection portion 372 (e.g., the fluid entrance 381 and the fluid exit 382) is in contact with or is fluidly coupled to the engine 200, a sealing member 384 (e.g., a gasket) can be used to create a seal to restrict fluid or oil from leaking during operation.

In some examples, the filtration system 300 includes a pressure bypass valve 370 to alleviate pressure build-up within the filtration system 300. The pressure bypass valve 370 includes a valve member 385 which is received within the connection portion 372. The valve member 385 is positioned before the fluid entrance 381 and is biased into a position restricting fluid flow from directly entering an interior of the bolt 386 and reaching the fluid exit 382 (i.e., bypassing the filter cartridge 310). In operation, if the filtration system 300 becomes clogged (i.e., if the pressure in the inlet 314 becomes high enough) the pressure bypass valve 370 creates an alternative flow path through the connection portion 372 to the engine 200. When the valve member 385 opens, an alternative fluid flow path through the valve 370 is created. The alternative fluid flow path allows fluid to travel through the connection portion 372, beyond the bypass valve 370, through the transverse passage 387 and into the interior of the bolt 386. The fluid can then travel through the internal passage within the bolt 386 and exit to the engine 200 through the fluid exit 382.

The pressure bypass valve 370 helps to prevent a clog or backup of the filtration system 300 from starving the engine 200 of oil. The valve member 385 is in contact with the fluid proximate (i.e., before) the fluid entrance 381. In normal conditions, a spring of the valve member 385 will keep the valve member 385 biased at least partially shut, such that a majority of fluid entering through the fluid entrance will be directed from the connection portion 372 to the inlet 314. In some examples, the valve member 385 is biased to restrict but not entirely block fluid communication between the fluid entering the filtration system 300 and the bolt 386. As the engine 200 may experience large differentials in fluid pressure during operation (e.g., during different cycles of the engine 200), it may be advantageous to permit some limited fluid communication between fluid entering the filtration system 300 and the engine 200. Under normal operating conditions (e.g., no clog is present), only a small portion of fluid is allowed to flow bypass the fluid entrance 381 and enter the engine 200 without being filtered as described above. In another embodiment, the valve member 375 may be biased completely shut when the filtration system 300 is not clogged and no fluid is allowed to bypass the fluid entrance 381 to flow to the engine 200 without being filtered as described above. However if the filtration system 300 experiences a clog or backup of some sort, pressure will build within the fluid and on the valve member 385. When the pressure becomes too great (e.g., 20 PSI), the fluid pressure overcomes the bias of spring in the valve member 385 and opens the valve member 385, allowing the fluid to bypass the fluid entrance 381, flow through the bypass valve 370, flow into the bolt 386, and flow to the engine 200 without any filtering.

As a result of the pressure bypass valve 370, the filtration system 300 includes two or more flow paths (i.e., a first fluid flow path and a second fluid flow path) for fluid entering the filtration system 300 to reach the engine 200. In operation, a majority of the fluid may flow along the first or primary fluid flow path from the fluid entrance 381, to the inlet 314, through the filter cartridge 310, to the outlet 319, out the fluid exit 382, and into the engine 200. In the first fluid flow path and when the filter cartridge 310 is installed within the base 325, the fluid must flow through the filter media 315 of the filter cartridge 310 before exiting the filtration system 300. If the fluid pressure within the filter cartridge 310 (or filtration system 300, generally) reaches a threshold value, the pressure bypass valve 370 may further open the second fluid flow path. The second fluid flow path provides a passage to bypass the fluid entrance 381, through the pressure bypass valve 370, into the bolt 386 and outward to the engine 200 through the fluid exit 382. Accordingly, the second fluid flow path bypasses the fluid entrance 381 (including the screen 383), the filter cartridge 310, and the filter media 315 while still providing fluid to the engine 200. In other embodiments, the drain assembly 320 may provide a third fluid flow path that leads from the inlet 314 to the engine 200. The third fluid flow path may be provided when the first fluid flow path and the second fluid flow path are not available (i.e., the filter cartridge 310 is not installed and therefore there is no pressure buildup in the filter cartridge 310) and may be from the inlet 314 to the drain 318 and from the drain 318 to the engine 200.

Figure 19:
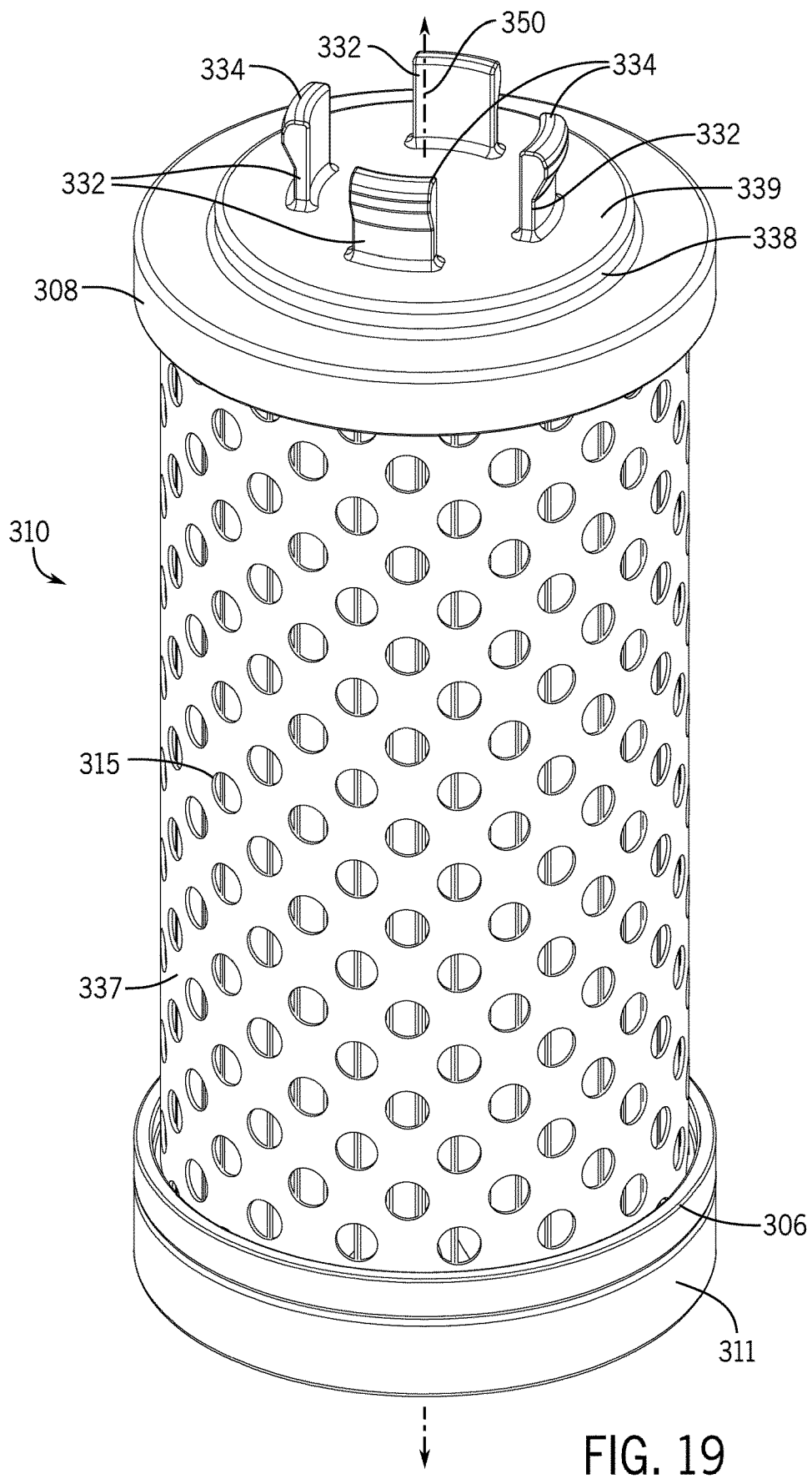
FIG. 19 is a top perspective view of a filter cartridge of the filtration system of FIG. 10.
Figure 20:
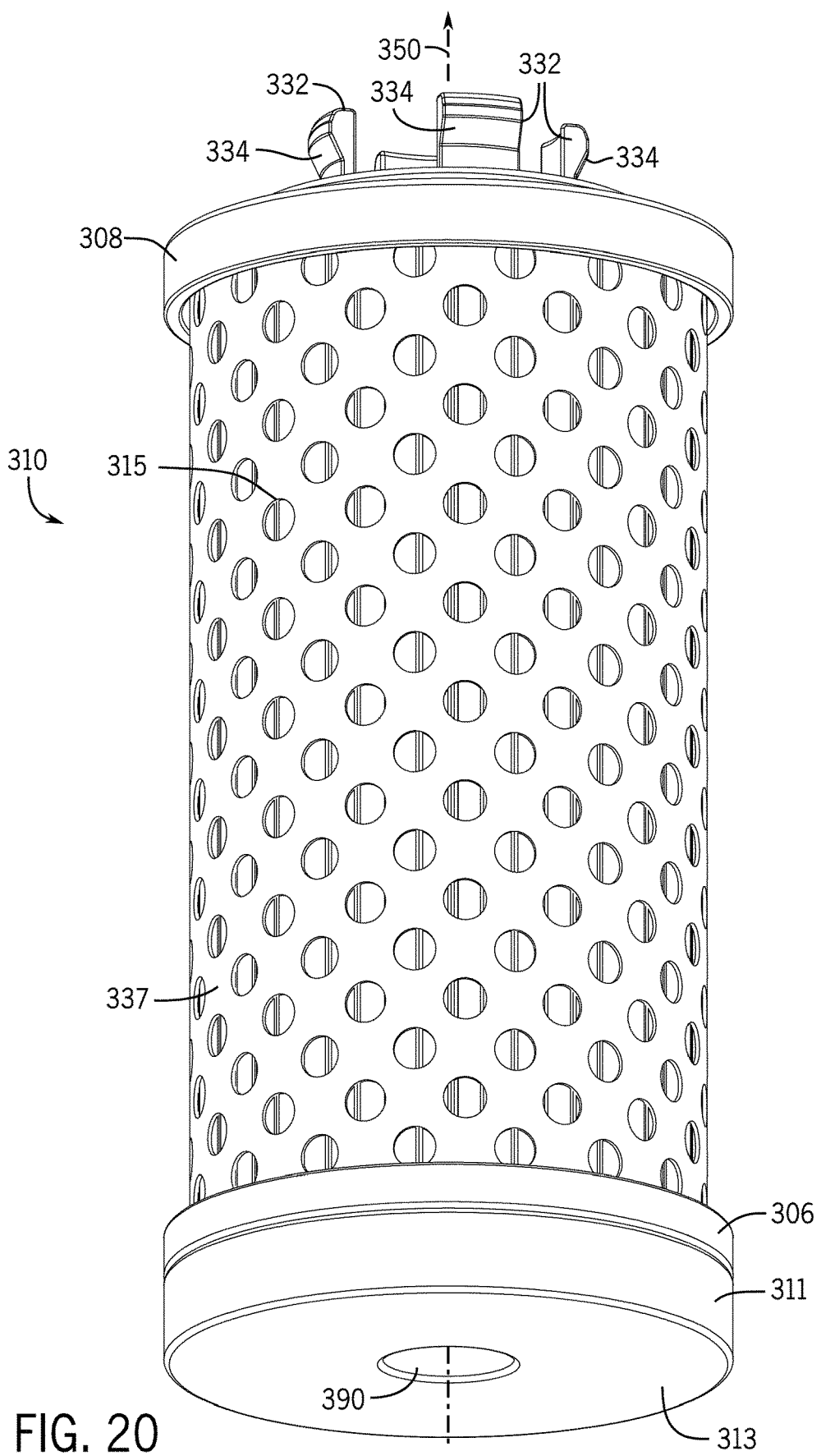
FIG. 20 is a bottom perspective view of the filter cartridge of FIG. 19.

Referring now to FIGS. 19-20, the filter cartridge 310 is shown. The filter cartridge 310 is similar to the filter cartridge 110 but further includes the mesh 337 and a modified bottom outlet. The mesh 337 provides a medium between the interior of the sleeve 341 and the filter media 315 and is located circumferentially around or radially outside of the filter media 315. The bottom endplate 306 and/or the flexible portion 311 further include a filter outlet opening 390 (as compared to the seal member 142 and the center projection 117) through which the fully filtered fluid is provided to the outlet 319 and through which the pipe 345 is received. The filter outlet opening 390 helps guide the filter cartridge 310 when the filter cartridge 310 is being installed into the base 325 by receiving the stand pipe 345. The top endplate 308 also includes a rim 338 formed on and extending axially from the top surface 339. The rim 338 provides a small contact surface when the cover 302 spins against the filter cartridge 310 during installation to reduce friction between the cover 302 and the filter cartridge 310.

The filtration system 300 also includes mounting features to help couple the filtration system 300 to the engine 200. For example, the filtration system 300 includes one or more flanges 301 (similar to the flanges 101), and one or more grommets 303 extending from and into the flanges 301. The grommets 303 function similarly to the apertures 103, and help couple the filtration system 300 to a blower housing of an engine (e.g., the engine 200). The grommets 303 can also provide vibrational isolation of the filtration system 300 from the blower housing and/or the engine 200 and allow the filtration system 300 to be better coupled to the engine. Various other types of fasteners can be used to couple the filtration system 300 to the engine 200 as well. For example, the filtration system 300 may include one or more vibration-isolating or common fasteners in place of the grommets 303 that couple the filtration system 300 to the blower housing and/or the engine 200. The filtration system 300 can also include one or more snap-fit connectors, press-fit connectors, etc. that allow coupling by pressing a male connector to a female connector (not shown).

It should be understood that this disclosure includes the combination of various components between the filtration system 100 and the filtration system 300. For example, in one embodiment, the filtration system 300 may include the drain valve assembly 120 in place of the drain assembly 320. In another example, the filtration system 100 may further include the sleeve 341. In even another example, the filtration system 300 includes the cover 102 as compared to the cover 302. In this way, the many features of the components are combinable and can be used in place of one another (e.g., the grommets 303 are received through one or more apertures (e.g., the apertures 103). For example, the filtration system 300 may include the filter cartridge 310 but further include the flexible portion 111 having a seal member 142 and a center projection 117 as compared to the flexible portion 311. In another example, the filtration system 300 may include the filter cartridge 310 but further include the baffle 144. Lastly, while the filtration system 300 is not pictured in operation with the engine 200, it should be understood that the filtration system 300 can be used directly in place of the filtration system 100 on the engine 200.

References herein to the positions of elements (e.g., "top," "bottom," "above," "below," etc.) are merely used to describe the orientation of various elements in the Figures. It should be noted that the orientation of various elements may differ according to other example embodiments, and that such variations are intended to be encompassed by the present disclosure. Further, the formation of a passage by one or more surfaces can comprise a wide variety of passage cross-sectional shapes, for example, passages having circular, rectangular, oval, etc. cross-sectional shapes.

As utilized herein, the term "substantially" and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed (e.g., within plus or minus five percent of a given angle or other value) are considered to be within the scope of the invention as recited in the appended claims. The term "approximately" when used with respect to values means plus or minus five percent of the associated value.

The terms "coupled" and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

It is important to note that the construction and arrangement of the various example embodiments are illustrative only. Although only a few embodiments have been described in detail in this disclosure, those skilled in the art who review this disclosure will readily appreciate that many modifications to the flow structures are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Additionally, features from particular embodiments may be combined with features from other embodiments as would be understood by one of ordinary skill in the art. Other substitutions, modifications, changes and omissions may also be made in the design, operating conditions and arrangement of the various example embodiments without departing from the scope of the present invention.

What is claimed is:

1. A filtration system, the filtration system comprising:
    a filter housing comprising a base and a cover removably coupled to the base, the cover comprising a retainer;
    a drain defined in the base;
    a channel defined in the base and having an outer diameter, the channel fluidly connected to the drain; and
    a filter cartridge having a longitudinal axis and being configured to be movable between an installed position within the filter housing when the cover is coupled to the base and an uninstalled position when the cover is decoupled from the base, the filter cartridge comprising:
        a top endplate comprising at least one protrusion extending upwardly away from the top endplate, the at least one protrusion including a tab extending radially outward from the at least one protrusion and structured to interact with the retainer to removably couple the filter cartridge to the cover;
        a bottom endplate, the bottom endplate having an outer diameter that is larger than the outer diameter of the channel such that the bottom endplate covers the channel when the filter cartridge is in the installed position; and a filter media extending axially between the top endplate and the bottom endplate;
    wherein the channel is not covered by the bottom endplate when the filter cartridge is in the uninstalled position; and
    a pressure bypass valve positioned in the base and movable between a first position restricting flow and a second position permitting flow, wherein in the second position, the pressure bypass valve provides a secondary flow path through the filter housing without passing through the filter cartridge, the pressure bypass valve moving to the second position when a threshold fluid pressure is reached within the filter cartridge.

2. The filtration system of claim 1, wherein the at least one protrusion comprises four protrusions extending upwardly away from the top endplate, wherein each of the four protrusions are structured to interact with the retainer to removably couple the filter cartridge to the cover, and wherein the four protrusions are circumferentially spaced apart about the longitudinal axis.

3. The filtration system of claim 1, wherein the base of the filter housing defines an inlet, and an outlet in fluid communication with the inlet, wherein during operation of the filtration system, fluid flows in a first flow path from the inlet, into the filter cartridge, and to the outlet.

4. The filtration system of claim 3, further comprising a cylindrically shaped sleeve positioned within the base, the sleeve circumferentially surrounding the filter cartridge and being located between the inlet and the filter cartridge when the filter cartridge is in the installed position, wherein an exterior of the sleeve and the base define a gap therebetween to direct fluid circumferentially about the filter cartridge, and wherein a slot is formed within the sleeve to define a fluid pathway from the gap into an interior of the sleeve to the filter cartridge.

5. The filtration system of claim 4, wherein a width of the gap is between approximately 0.001 inches and approximately 0.1 inches.

6. The filtration system of claim 1, wherein the tab interacts with the retainer by engaging and at least partially overlapping the retainer to create a removable coupling between the filter cartridge and the cover.

7. The filtration system of claim 1, further comprising a pipe coupled to the base and configured to be at least partially received by the filter cartridge when the filter cartridge is in the installed position.

8. A filtration system, the filtration system comprising:

a filter housing comprising a base and a cover removably coupled to the base, the cover comprising a retainer, the base comprising:

a drain; an outlet; an inlet fluidly coupled to the outlet; a first raised surface defining a first bottom portion; a second raised surface defining a second bottom portion; and a channel defined between the first bottom portion and the second bottom portion, the channel fluidly connected to the drain; and a filter cartridge having a longitudinal axis and being configured to be movable between an installed position within the filter housing when the cover is removably coupled to the base and an uninstalled position when the cover is decoupled from the base, the filter cartridge comprising: a top endplate comprising at least one protrusion structured to interact with the retainer to removably couple the filter cartridge to the cover;

a bottom endplate defining a filter outlet opening, the bottom endplate configured to contact the first bottom portion and the second bottom portion when the filter cartridge is in the installed position such that a fluid cannot flow into the drain when the filter cartridge is in the installed position; and a filter media extending axially between the top endplate and the bottom endplate; and a pipe coupled to the base, the pipe extending into the filter outlet opening and toward the top endplate when the filter cartridge is in the installed position to define a portion of a fluid flow path between the inlet and the outlet;

wherein the channel is not covered by the bottom endplate when the filter cartridge is in the uninstalled position; and a pressure bypass valve positioned in the base and movable between a first position restricting flow and a second position permitting flow, wherein in the second position, the pressure bypass valve provides a secondary flow path through the filter housing without passing through the filter cartridge, the pressure bypass valve moving to the second position when a threshold fluid pressure is reached within the filter cartridge.

9. The filtration system of claim 8, wherein the pipe is received by the filter outlet opening such that the pipe extends along the longitudinal axis and is located within the filter media, and wherein the pipe fluidly couples an interior of the filter media to the outlet.

10. The filtration system of claim 9, wherein the pipe is received by the filter outlet opening such that an inlet opening of the pipe is located proximate the top endplate, and wherein the fluid flow path extends from the inlet, to the inlet opening of the pipe, to the outlet.

11. The filtration system of claim 8, wherein the top endplate comprises four protrusions extending upwardly away from the top endplate, wherein the four protrusions are circumferentially spaced about the longitudinal axis.

12. The filtration system of claim 8, wherein the cover comprises a cup structured to retain fluid when the cover is inverted.

13. The filtration system of claim 8, wherein the cover further comprises a hex drive extending upwardly away from the cover.

14. The filtration system of claim 4, wherein the gap is configured to affect a flow velocity of the fluid within the filter housing.

15. The filtration system of claim 4, wherein the gap is configured to increase a flow velocity of the fluid such that an average temperature of the fluid is reduced.

16. The filtration system of claim 4, wherein fluid entering the base is directed through the gap and the slot.

17. The filtration system of claim 4, wherein the sleeve is configured to impart a rotational flow within the filter housing.

18. The filtration system of claim 17, wherein the rotational flow is configured to effectuate cyclonic filtering of the fluid.

* * * * *